(12) United States Patent
Kantecki et al.

(10) Patent No.: US 10,686,763 B2
(45) Date of Patent: *Jun. 16, 2020

(54) TECHNIQUES FOR LOAD BALANCING IN A PACKET DISTRIBUTION SYSTEM

(71) Applicant: Intel Corporation, Santa Clara, CA (US)

(72) Inventors: Tomasz Kantecki, Ennis (IE); Niall McDonnell, Limerick (IE)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/413,151

(22) Filed: Jan. 23, 2017

(65) Prior Publication Data

US 2017/0324713 A1    Nov. 9, 2017

Related U.S. Application Data

(63) Continuation of application No. 14/582,098, filed on Dec. 23, 2014, now Pat. No. 9,553,853.

(51) Int. Cl.
*H04L 29/06* (2006.01)

(52) U.S. Cl.
CPC ................. *H04L 63/0442* (2013.01)

(58) Field of Classification Search
CPC .................................................. H04L 63/0442
See application file for complete search history.

(56) References Cited

U.S. PATENT DOCUMENTS

| 6,378,072 | B1 * | 4/2002 | Collins | G06F 21/572 713/161 |
| 6,678,270 | B1 * | 1/2004 | Garfinkel | H04L 63/126 370/392 |
| 7,765,405 | B2 * | 7/2010 | Pinkerton | H04L 9/3236 713/181 |
| 8,281,122 | B2 * | 10/2012 | Durham | H04L 9/0827 713/150 |
| 9,356,866 | B1 * | 5/2016 | Sivaramakrishnan | H04L 45/7453 |

(Continued)

OTHER PUBLICATIONS

Iqbal et al., Flow Migration on Multicore Network Processors: Load Balancing While Minimizing Packet Reordering, 2013, CPS.*

(Continued)

*Primary Examiner* — David Garcia Cervetti

(57) ABSTRACT

Various embodiments are generally directed to techniques to distribute encrypted packets among multiple cores in a load-balanced manner for further processing. An apparatus may include a processor component; a decryption component to decrypt an encrypted packet to generate a decrypted packet from the encrypted packet, the encrypted packet comprising a header that comprises at least one field of information; a hash component to generate a header hash from the at least one field of information during decryption of at least a portion of the encrypted packet by the decryption component, the header hash comprising a smaller quantity of bits than the at least one field of information; and a distribution component to select a first core of multiple cores coupled to the processor component based on the header hash and to transmit the decrypted packet to the first core from the processor component. Other embodiments are described and claimed.

21 Claims, 10 Drawing Sheets

(56) References Cited

U.S. PATENT DOCUMENTS

| | | | |
|---|---|---|---|
| 2002/0089979 A1* | 7/2002 | Abdulkader | H04L 63/0428 370/389 |
| 2002/0097724 A1* | 7/2002 | Halme | H04L 67/1002 370/392 |
| 2004/0052377 A1* | 3/2004 | Mattox | H04N 7/163 380/277 |
| 2004/0125799 A1* | 7/2004 | Buer | G06F 16/9014 370/389 |
| 2004/0165588 A1* | 8/2004 | Pandya | H04L 63/0218 370/389 |
| 2004/0210320 A1* | 10/2004 | Pandya | H04L 29/06 700/1 |
| 2004/0225885 A1* | 11/2004 | Grohoski | G06F 9/3879 713/189 |
| 2005/0108518 A1* | 5/2005 | Pandya | H04L 63/0485 713/151 |
| 2005/0283824 A1* | 12/2005 | Nakamura | G06F 21/604 726/1 |
| 2006/0190613 A1* | 8/2006 | Corl, Jr. | H04L 29/12009 709/230 |
| 2007/0005742 A1* | 1/2007 | Eldar | G06F 9/4812 709/223 |
| 2007/0101138 A1* | 5/2007 | Camenisch | H04L 9/3263 713/168 |
| 2007/0113087 A1* | 5/2007 | Yoshizawa | H04L 9/0891 713/168 |
| 2009/0287941 A1* | 11/2009 | Shouno | G06F 21/80 713/193 |
| 2009/0303883 A1* | 12/2009 | Kucharczyk | H04L 12/4645 370/241 |
| 2010/0223457 A1* | 9/2010 | Durham | H04L 63/0428 713/152 |
| 2010/0265824 A1* | 10/2010 | Chao | H04L 12/66 370/235 |
| 2010/0284404 A1* | 11/2010 | Gopinath | G06F 9/5005 370/392 |
| 2010/0287227 A1* | 11/2010 | Goel | H04L 67/1002 709/202 |
| 2010/0322076 A1* | 12/2010 | Goel | G06F 9/505 370/236 |
| 2010/0322265 A1* | 12/2010 | Gopinath | H04L 49/901 370/417 |
| 2011/0013638 A1* | 1/2011 | Matthews | H04L 45/00 370/395.32 |
| 2011/0026403 A1* | 2/2011 | Shao | H04L 67/2895 370/235 |
| 2011/0145573 A1* | 6/2011 | Nakai | H04L 63/0428 713/160 |
| 2011/0191624 A1* | 8/2011 | Rodgers | G06F 15/16 714/4.11 |
| 2012/0033673 A1* | 2/2012 | Goel | H04L 47/30 370/400 |
| 2012/0189013 A1* | 7/2012 | Goglin | H04L 12/56 370/395.32 |
| 2012/0227039 A1* | 9/2012 | Ferdman | G06F 9/5027 718/1 |
| 2013/0103871 A1* | 4/2013 | Domsch | G06F 9/5005 710/267 |
| 2013/0104127 A1* | 4/2013 | Domsch | G06F 9/45558 718/1 |
| 2013/0265883 A1* | 10/2013 | Henry | H04L 43/0876 370/241 |
| 2013/0298201 A1* | 11/2013 | Aravindakshan | H04L 63/0272 726/4 |
| 2014/0056307 A1* | 2/2014 | Hutchison | H04L 49/552 370/394 |
| 2014/0269766 A1* | 9/2014 | Gopalasetty | H04W 28/065 370/473 |
| 2014/0282830 A1* | 9/2014 | Davis, Jr. | H04L 63/0227 726/1 |
| 2014/0321462 A1* | 10/2014 | Kancherla | H04L 45/72 370/389 |
| 2014/0344326 A1* | 11/2014 | Kamath | H04L 67/1008 709/203 |
| 2015/0124828 A1* | 5/2015 | Cj | H04L 12/4633 370/392 |
| 2015/0146720 A1* | 5/2015 | Subramanian | H04L 45/121 370/390 |
| 2015/0281081 A1* | 10/2015 | Rajahalme | H04L 45/7453 370/392 |
| 2015/0281082 A1* | 10/2015 | Rajahalme | H04L 69/22 370/392 |
| 2015/0281089 A1* | 10/2015 | Marchetti | H04L 47/125 370/235 |
| 2015/0304427 A1* | 10/2015 | Ortacdag | H04L 61/256 713/160 |
| 2015/0341383 A1* | 11/2015 | Reddy | H04L 63/0245 726/22 |
| 2015/0341421 A1* | 11/2015 | Chauhan | H04L 69/163 709/203 |
| 2015/0341428 A1* | 11/2015 | Chauhan | H04L 69/16 709/203 |
| 2015/0341466 A1* | 11/2015 | Sah | G06F 16/2471 707/770 |
| 2016/0026683 A1* | 1/2016 | Sah | G06F 16/2453 707/770 |
| 2016/0028855 A1* | 1/2016 | Goyal | H04L 67/16 709/203 |
| 2016/0043865 A1* | 2/2016 | Matsakis | H04L 63/0428 713/168 |

OTHER PUBLICATIONS

Jiang et al., Load Balancing by Ruleset Partition for Parallel IDS on Multi-Core Processors , ICCCN 2013.*

Latifi et al., Increasing the Efficiency of IDS Systems by Hardware Implementation of Packet Capturing, Aug. 2013, MECS.*

* cited by examiner

TECHNIQUES FOR LOAD BALANCING IN A PACKET DISTRIBUTION SYSTEM

CROSS-REFERENCE TO RELATED APPLICATIONS

This application is a continuation of, claims the benefit of and priority to previously filed U.S. patent application Ser. No. 14/582,098 filed Dec. 23, 2014, entitled "TECHNIQUES FOR LOAD BALANCING IN A PACKET DISTRIBUTION SYSTEM," which issued as U.S. Pat. No. 9,553,853 on Jan. 24, 2017, the subject matter of which is incorporated herein by reference in its entirety.

BACKGROUND

As telecommunications using packet-based networks continues to supplant older digitized and/or analog forms of telecommunications, volume on newer packet-based telecommunications networks continues to increase such that ever more bottlenecks that hamper efforts to scale up components of such networks are arising. Among such bottlenecks are components that analyze packets as part of routing them between endpoints in such networks.

Such analysis often entails accessing and using one or more pieces of information in a header of each packet, such as an identifier of a destination of the packet, such as an identifier of a user, a location or a specific device. However, such an approach suffers from the need for many devices along the path of a packet through such a network to each perform the same type of access and use of the header of the packet. As the volume of packets through such a network continues to scale up, the processing effort and delays of performing such accesses and making such use of headers can become significant.

DETAILED DESCRIPTION

Figure 1:
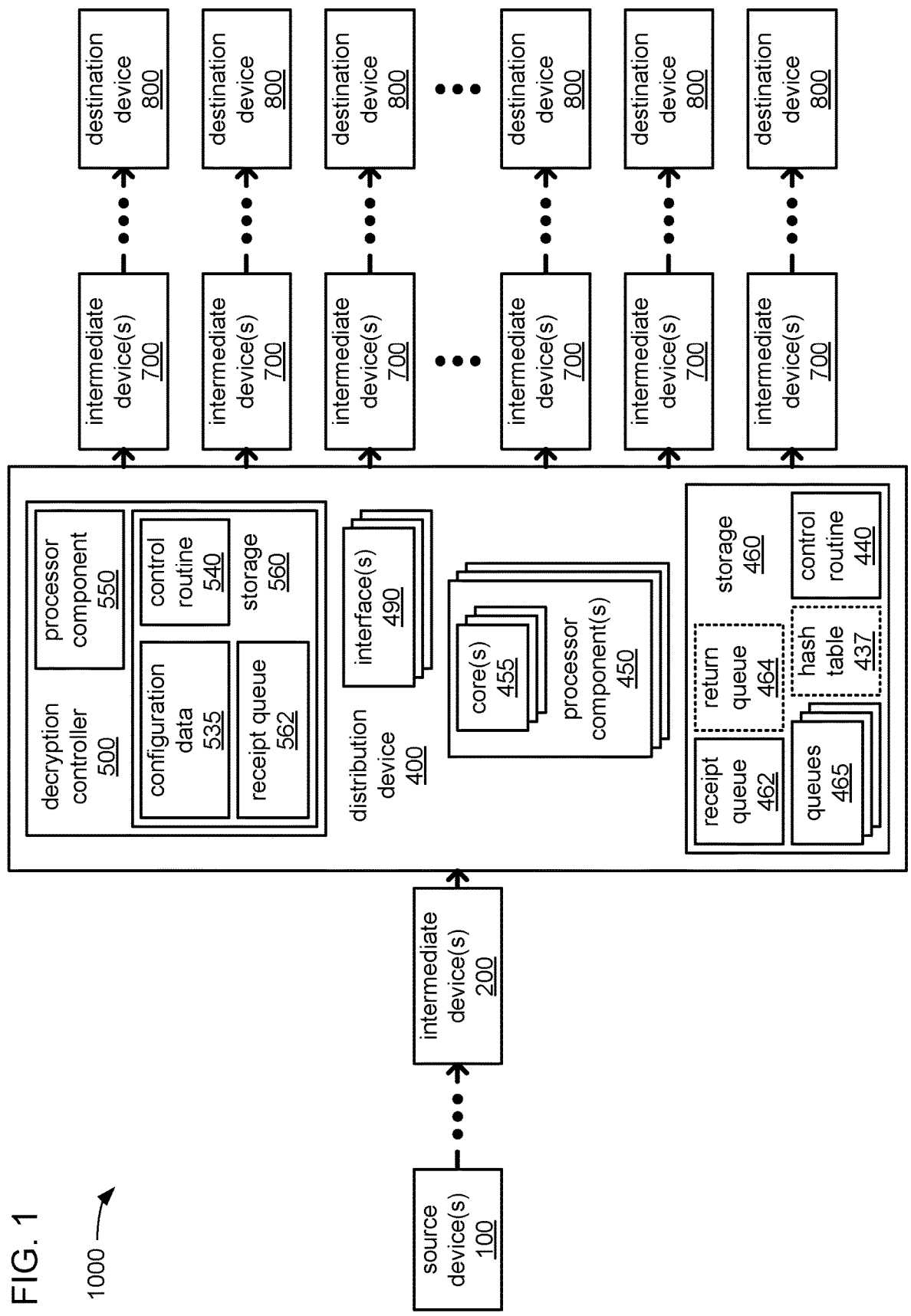
FIG. 1 illustrates an example embodiment of a distribution system.

Various embodiments are generally directed to techniques to distribute encrypted network packets among multiple cores in a load-balanced manner for further processing and/or routing to destination devices. Advantage may be taken of the need to access the entirety of an encrypted packet as part of decrypting it to generate a header hash from one or more identifiers included in the header of that packet. At least a portion of the header hash may then be used to select which of multiple processing cores is to be provided with the packet to perform further processing thereon. As part of such further processing by the selected one of the cores, the header hash may be compared to entries of a hash table by the selected one of the cores to determine where to route the packet to as part of directing the packet towards its destination.

Encrypted packets may be received at a distribution device of a packet-based network from one or more source devices and/or through one or more intermediate devices defining a path along which the encrypted packets may be relayed to reach the distribution device. At such a distribution device, each of the encrypted packets may be decrypted, at least temporarily, to access one or more identifiers within the header to ascertain an identity of a destination device towards which the distribution device is to route that packet. Alternatively or additionally, any of a variety of types of processing may be performed by the distribution device on the data making up the payload of at least some of the packets following decryption and before routing the packets onward. Such processing of the data of a payload of a packet may be part of preparing the data in that payload for use by a particular device to which the distribution device is to route that packet.

Within the distribution device, at least one processor component may be largely dedicated to performing the decryption of packets. Such a processor component may be somewhat specialized for such a use, having an instruction set, a register set and/or other internal architecture features in its instruction pipeline that better optimize the processor component for the variety of computations usually encountered in performing decryption. Further, within the distribution device, one or more other processor components may provide a set of processing cores that may be used to perform any of a variety of types of processing on the data making up the payload of at least some of the packets, as has been described.

It may be deemed desirable to balance the load of such processing among those cores and/or to use those cores to at least identify the destination device towards which the distribution device is to route each packet. Doing either may require one or more of those cores to access the one or more of the identifiers in the header of each packet. However, and as familiar to those skilled in the art, each of the one or more identifiers accessed in the header may be numerous bytes in size. Although such a size may seem relatively small, for a distribution device at a high traffic location in the network through which a relatively high volume of packets are transferred, the processing resources consumed by so many of such accesses to identifiers of such size may become significant.

To reduce the frequency with which such identifiers are accessed among the various processor components and/or cores of the distribution device, advantage may be taken of the accesses made to at least most, if not all, of the encrypted packet at the time decryption is performed by the processor component that may be largely dedicated to performing decryption. As recognizable to those skilled in the art, many decryption techniques require access to large portions of, if not all of, the bits making up the item to be decrypted. Thus, large portions of, if not all of, the item to be decrypted is typically stored in a buffer to which a processor component performing such decryption has access.

Thus, the processor component of the distribution device that performs decryption may be employed to make use of such access to at least a large portion of a packet as that processor component decrypts that packet to access one or more of the identifiers in the header and to generate a header hash therefrom. The calculation used to generate the header hash may be a hash of a type resembling a checksum or other similar calculation, and not a cryptographic hash such as a message direct hash (e.g., MD5) or a secure hash algorithm (e.g., SHA1, SHA2 or SHA3) usually associated with data encryption or enforcing a security policy. The size of the header hash in bits or bytes may be significantly smaller than the size in bits or bytes of each of the one or more identifiers used to generate it. Following generation of the header hash for a particular packet, that packet and the header hash generated from one or more of its identifiers, the header hash may be used to distribute the load of the further processing among the cores and/or may be used to identify the destination device to which that packet is to ultimately be routed. Such use of the header hash may be in lieu of using the one or more identifiers for such purposes.

With the significantly smaller size of the header hash in comparison to the one or more identifiers in the header, each access to the header hash may take less time and/or consume less space in registers and/or caches of a processing core. Such use of a header hash made from one or more of the identifiers of a packet header in lieu of using the one or more identifiers directly may be based on the relatively low probability that the header hashes derived from identifier(s) for two or more packets will turn out to have the same value despite the header hashes being significantly smaller than the one or more identifiers. The header hashes generated for each of the packets during their decryption may be used as if they are random numbers for selecting which core each decrypted packet is provided to for processing. Alternatively or additionally, the header hashes may be employed in correlating each packet to a destination device via a comparison of header hashes generated for each packet during decryption to header hashes generated earlier from identifiers of related earlier packets and stored in a hash table.

In some embodiments, the network may be digital telecommunications network employing any of a variety of types of Voice Over Internet Protocol (VOIP) or other digitized voice encoding technology in which at least some of the encrypted packets may convey portions of speech between communications devices (e.g., wired and/or wireless phones) used by persons to engage in a conversation through the network. Thus, one or more of the source devices from which encrypted packets may be received by the distribution device may be communications devices or may be one or more intermediate devices that relay such packets to the distribution device from a branch of the network. Correspondingly, one or more of the destination device that the distribution device routes such packets towards may also be communications devices and/or may be one or more intermediate devices that relay such packets onward in a branch of the network towards one or more destination devices.

With general reference to notations and nomenclature used herein, portions of the detailed description which follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may include a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1 illustrates a block diagram of an embodiment of a distribution system 1000 incorporating one or more of source device(s) 100, intermediate device(s) 200, a distribution device 400, other intermediate device(s) 700 and destination device(s) 800. The one or more source devices 100 may exchange data in the form of network packets with the distribution device 400 through the one or more intermediate devices 200 and/or portion(s) of a network 999. Similarly, the distribution device 400 may exchange data in the form of network packets with the one or more destination devices 800 through the one or more intermediate devices 700 and/or portion(s) of the network 999.

The distribution device 400 may be within the network 999 at a location that serves as an exchange point between branches of the network 999. At such a location, the distribution device 400 may receive packets from the one or more source devices 100 through one branch of the network 999. In so doing, the distribution device 400 may receive those packets as relayed through one or more of the intermediate devices 200 associated with that branch. The distribution device 400 may then retransmit those packets to one or more of the destination devices 800 through different branches of the network 999. In so doing, the distribution device 400 may transmit those packets through one or more of the intermediate devices 700.

As received by the distribution device 400, the packets from the one or more source devices 100 may be encrypted. Encryption of those packets may be performed by one or more of the source devices 100 before those packets are transmitted into the network 999. Alternatively or additionally, encryption of those packets may be performed by one or more of the intermediate devices 200. For each packet received by the distribution device 400, the distribution device 400 may decrypt it and then determine which of the one or more destination devices 800 may be the intended destination of that packet. The distribution device 400 may additionally perform any of a variety of types of processing on at least some of the received packets before routing them to their corresponding ones of the destination devices 800.

In some embodiments, each of the one or more source devices 100 and/or each of the one or more destination devices 800 may be a smartphone or other form of computing device capable of voice communications via exchanges of packets carrying payloads of digitized speech sounds through the network 999. In such embodiments, the distribution device 400 may be positioned at a trusted physical location at which it may be deemed appropriate to decrypt the packets to determine their destinations and/or to perform one or more forms of processing thereon.

More generally, each of these devices 100, 200, 400, 700 and 800 may be any of a variety of types of computing device, including without limitation, a desktop computer system, a data entry terminal, a laptop computer, a netbook computer, a tablet computer, a handheld personal data assistant, a smartphone, smart glasses, a smart wristwatch, a digital camera, a smart card incorporating a processor component, a body-worn computing device incorporated into clothing, a computing device integrated into a vehicle (e.g., a car, a bicycle, a wheelchair, etc.), a server, a cluster of servers, a server farm, etc.

As depicted and discussed, at least the computing devices 100, 200, 400, 700 and 800 may exchange signals conveying packets from the one or more source devices 100 to appropriate one(s) of the one or more destination device(s) 800, and such exchanges may occur through a network 999. However, one or more of these computing devices may also exchange data entirely unrelated to such transmission of such packets with each other and/or with still other computing devices (not shown) via the network 999. In various embodiments, at least the network 999 may be a single network possibly limited to extending within a single building or other relatively limited area, a combination of connected networks possibly extending a considerable distance, and/or may include the Internet. Thus, at least the network 999 may be based on any of a variety (or combination) of communications technologies by which signals may be exchanged, including without limitation, wired technologies employing electrically and/or optically conductive cabling, and wireless technologies employing infrared, radio frequency or other forms of wireless transmission.

In various embodiments, the distribution device 400 may incorporate one or more processor components 450, a storage 460 and/or one or more interfaces 490 to couple the distribution device 400 to the network 999. The storage 460 may store one or more of a control routine 440, a receipt queue 462, a return queue 464, multiple queues 465 and a hash table 437. Each of the one or more processor components 450 may incorporate one or more processing cores 455 to each execute a sequence of instructions. As a result, the distribution device 400 may include multiple ones of the cores 455, regardless of whether all of those cores 455 are provided by a single one of the processor components 450 or by multiple ones of the processor components 450. The control routine 440 may incorporate a sequence of instructions operative on each core 455 of the one or more processor components 450 in the role of the one or more processor components 450 as the main processor component(s) of the distribution device 400 to implement logic to perform various functions. As a result, multiple instances of the control routine 440 may be executed simultaneously, each instance by one of the cores 455.

In some embodiments, the distribution device 400 may additionally incorporate a decryption controller 500. In such embodiments, the decryption controller 500 may incorporate one or both of a processor component 550 and a storage 560. The storage 560 may store one or more of a control routine 540, a configuration data 535 and a receipt queue 562. The control routine 540 may incorporate a sequence of instructions operative on the processor component 550 in its role as a controller processor component of the controller 500 to implement logic to perform various functions.

In executing an instance of the control routine 440, a core 455 of the multiple cores 455 provided by the one or more processor components 450 may be caused to operate one of the one or more interface 490 to receive an encrypted packet through the network 999 from one of the one or more source devices 100. In so doing, that core 455 may store the encrypted packet in the receipt queue 462 and/or relay the encrypted packet to the decryption controller 500 to at least be decrypted. Again, such an encrypted packet may be received through one or more of the intermediate devices 200. Also, as previously discussed, it may be the source device 100 at which the encrypted packet originates or one or more of the intermediate devices 200 through which the encrypted packet is relayed to the distribution device 400 that actually encrypts that packet.

In executing the control routine 540, the processor component 550 may be caused to receive the encrypted packet from the one core 455 that originally received the encrypted packet from one of the source devices 100 via the network. In so doing, the processor component 550 may store the encrypted packet in the receipt queue 562 in preparation for decrypting it. As part of decrypting the encrypted packet, the processor component 550 may access the header of the encrypted packet in which may be multiple fields of information concerning the packet and its contents. In so accessing those fields, the processor component 550 may retrieve one or more identifiers from those fields and may perform a hash calculation on at least those one or more identifiers to create a header hash.

As familiar to those skilled in the art, the header of a network packet may include multiple fields in which there may be information concerning the data that makes up the payload of the packet, such as the quantity of the data and/or the type of data. Alternatively or additionally, there may be one or more fields in the header in which there may be chronological information concerning the packet, such as the time and/or date at which the packet was created and/or most recently modified. Also alternatively or additionally, there may be one or more fields in the header in which there may be identifiers associated with the packet. Such identifiers may each be a value of up to multiple bytes in size that may identify one or more devices (or portions thereof) as a source or destination of the packet, a transaction occurring through the network 999 of which the transmission of the packet is a part, a process or thread of an application being executed within a device at a source or a destination of the packet, etc. Various aspects of the header, including the quantity of fields, the types and/or sizes of the fields, what information is stored in each of the fields and/or how that information is encoded in the bits or bytes that make up each of the fields may vary among networks depending on such factors as the technologies on which a network is based, the standards to which the networks adheres (including protocols), and/or the purposes served by a network.

In some embodiments, which fields of the header are selected for inclusion in the hash calculation and/or what type of hash calculation is performed by the processor component 550 as part of executing the control routine 540 may be configurable to accommodate such variances in what is included in the header. Indeed, in some embodiments, what fields of the header are included in the hash calculation and/or the type of hash calculation performed may be dynamically selected per packet based on such factors as the particular one of the sources 100 from which the packet originates, what branch of the network the packet was received from, etc. Among the type of hash calculations that may be selected to be performed may be checksum or similar calculation across the bits or bytes making up the fields selected for inclusion in the hash calculation, instead of a cryptographic hash calculation often performed as part of data encryption and/or verification.

In some embodiments, following decryption of the encrypted packet and generation of the header hash by the processor component 550, the processor component 550 may provide both of the now decrypted packet and the header hash back to the same core 455 that originally received the encrypted packet. In so receiving the decrypted packet and the header hash, that core 455 may at least temporarily store one or both in the return queue 464 while the core 455 is caused by further execution of the control routine 440 to use the hash to determine which core 455 of the multiple cores 455 is to perform further processing of the decrypted packet. In so using the header hash to select one of the cores 455, the one of the cores that received the decrypted packet and header hash may use the binary value of the header hash in a manner akin to a random number, and may correlate at least a portion of its binary value in any of a variety of ways to one of the multiple cores 455. By way of example in one approach to correlation, the multiple cores 455 may be numbered in a range from 0 to however many of the cores 455 there are, subtracted by one. Then, a subset of the bits of each header hash may be used to specify a value in that range, thereby selecting a core 455. Still other approaches to using selecting a core based on the header hash are possible. It should be noted that in some of such embodiments, one of the multiple cores 455 may be the very same core 455 that received the decrypted packet and header hash from the decryption controller 500. With the selection of one of the multiple cores 455 having been made, the one of the cores that received the decrypted packet and header hash may store at least the decrypted packet in a one of the queues 465 from which the selected one of the cores 455 may retrieve it.

In other embodiments, following decryption of the encrypted packet and generation of the header hash by the processor component 550, it may be the processor component 550 that uses the header hash to make the selection of which core 455 of the multiple cores 455 is to perform further processing of the decrypted packet. Upon making that selection, the processor component may store at least the decrypted packet in a one of the queues 465 from which the selected one of the cores 455 may retrieve it.

Regardless of the exact manner in which one of the cores 455 is selected to perform further processing of the decrypted packet, that one of the cores 455 may, in executing an instance of the control routine 440, retrieve the decrypted packet from the one of the queues 465 into which it was stored, and then perform such further processing on the decrypted packet. Such further processing may include scanning the data making up the payload of the decrypted packet for malicious routines (e.g., so-called "viruses" or other "malware"). Alternatively or additionally, such further processing may include re-encrypting the decrypted packet in preparation for transmission of the packet to another device (e.g., one of the destination devices 800 and/or an intermediate device 700 along the path thereto) with a different key than was used in its last encryption and/or to use a different encryption algorithm than was used in its last encryption. Also alternatively or additionally, in embodiments in which the decrypted packet conveys digitized speech, such further processing may include a form of digital signal processing on the digitized speech to change its encoding, sampling rate, range of audible frequencies, etc.

Following the performance of one or more forms of further processing, the one of the cores 455 performing that further processing may then route the now further processed packet towards one of the destination devices 800. As depicted in FIG. 1, such routing may, in some embodiments, entail selecting one of multiple branches of the network 999 into which to transmit the further processed packet as part of routing it towards an appropriate one of the destination devices 800. In support of doing so in such embodiments, the distribution device 400 may incorporate multiple ones of the interfaces 490 and individual ones of at least a subset of those interfaces 490 may each be separately coupled to each of those different branches. However, despite this depiction, in other embodiments, there may not be such physically separable and/or identifiable branches of the network 999, and therefore, there may not be multiple ones of the interfaces 490 that are each dedicated to separately transmitting packets onto those different branches. Instead, such "branches" may be implemented as different virtual private network (VPN) channels formed by the use of secure protocols through the network 999 between the distribution device 400 and one or more of the intermediate devices 700 and/or one or more of the destination devices 800. Still other physical and virtual configurations of the network 999 and corresponding other forms of routing of packets towards ones of the destination devices 800 may occur to those skilled in the art.

Figure 2A:
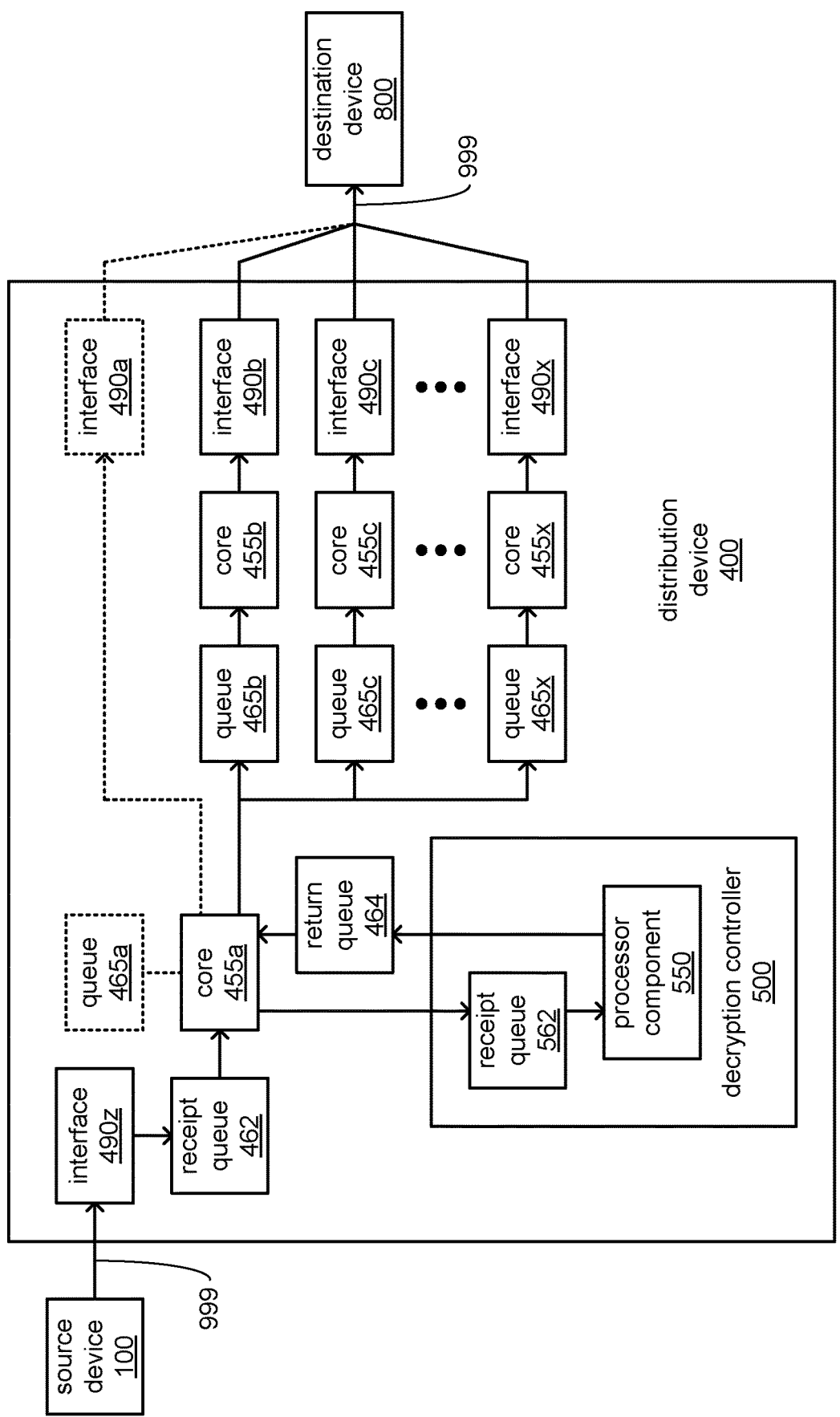
FIG. 2A illustrates an example embodiment of decryption and distribution of a packet.
Figure 2B:
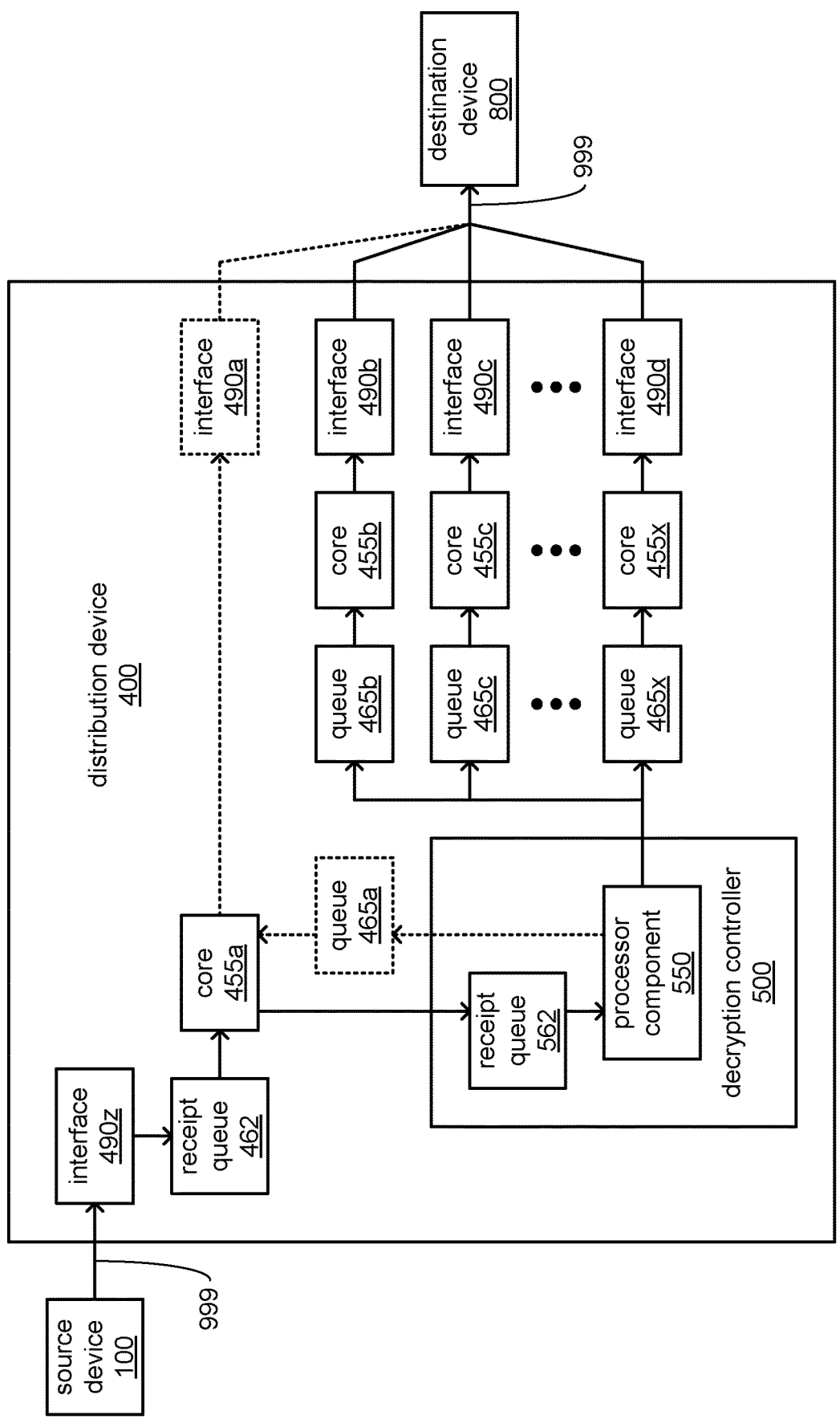
FIG. 2B illustrates another example embodiment of decryption and distribution of a packet.

FIGS. 2A and 2B, together, illustrate in greater detail differing examples of the path followed by an encrypted packet through components of the distribution device 400 as earlier described with regard to FIG. 1. FIG. 2A depicts an example in which a decrypted packet and header hash may be provided by the decryption controller 500 to one of the cores 455 more specifically designated as the core 455a to enable that core 455a to use the header hash to select one of the multiple cores 455 to perform further processing. FIG. 2B depicts an example in which the header hash may, instead, be used by the decryption controller 500 to itself select one of the multiple cores 455 to perform further processing. Referring to both FIGS. 2A and 2B, it should be noted that the multiple cores 455 discussed with reference to FIG. 1 are depicted in FIGS. 2A and 2B with the designations 455a through 455x in which "a-x" is meant to convey that there are multiple ones of the cores 455 of any quantity of more than one. Also, the multiple queues 465 discussed with reference to FIG. 1 are similarly depicted in FIGS. 2A and 2B with the designations 465a through 465x. Further, the multiple interfaces 490 discussed with reference to FIG. 1 are similarly depicted in FIGS. 2A and 2B with the designations 490a through 490x, as well as still one more of the multiple interfaces 490 depicted in FIGS. 2A and 2B with the designation 490z.

In both FIGS. 2A and 2B, the core 455a may receive an encrypted packet from one of the source devices 100 via the interface 490z, and in executing an instance of the control routine 440, may temporarily store the encrypted packet in the receipt queue 462. As depicted, the interface 490z may be one of multiple ones of the interface 490 that may be dedicated to receiving encrypted packets. The core 455a may then relay the encrypted packet to the decryption controller 500 where the processor component 550, in executing the control routine 540, may temporarily store the encrypted packet within the receipt queue 562. In further executing the control routine 540, the processor component 550 may then decrypt the encrypted packet and generate a header hash from one or more of the identifiers and/or other information stored in one or more fields of the header of the encrypted packet.

Turning more specifically to FIG. 2A, following decryption of the encrypted packet and generation of the header hash, the processor component 550 may then relay both the decrypted packet and the header hash back to the core 455a through the return queue 464. The core 455a may then use the header hash to select one of the multiple cores 455 to perform further processing on the decrypted packet. It may be that such a selection of one of the multiple cores 455 to perform the further processing may be limited to one of the cores 455b through 455x, thereby leaving out the core 455a. Alternatively, it may be that such a selection may not be so limited such that the core 455a may select itself as the one of the multiple cores to perform the further processing.

Where the core 455a selects one of the other cores 455b-x to perform the further processing, the core 455a may store at least the decrypted packet in one of the queues 465b-x that corresponds to the selected one of the cores 455b-x. Where the core 455a selects itself to perform the further processing (in embodiments where this is permitted), the core 455a may store at least the decrypted packet in the queue 465a that corresponds to the core 455a. It should be noted that despite the depiction of a one-to-one correspondence of the queues 465a-x to the cores 455a-x, other embodiments are possible in which there may be a quantity of the queues 465 that differs from the quantity of the cores 455. By way of example, each of the cores 455 may have a multitude of the queues 465 associated with it and may be able to retrieve a decrypted packet on which to perform further processing from any of those queues. By way of another example, multiple ones of the queues 465 may be pooled together, and any of the multitude of cores 455 may be able to retrieve a decrypted packet on which to perform further processing from any of the queues in that pool. Still other configurations of the multitude of queues 465 and the multitude of cores 455 may occur to those skilled in the art.

Following the further processing of the decrypted packet by the selected one of the cores 455a-x or 455b-x (depending on whether the core 455a is permitted to select itself to do the further processing), that selected one of the cores may then operate a corresponding one of the interfaces 490a-x or 490b-x to transmit the now further processed packet to one of the destination devices 800. It should be noted that despite the depiction of a one-to-one correspondence of the cores 455a-x to the interfaces 490a-x, other embodiments are possible in which there may be a quantity of the interfaces 490 that differs from the quantity of the cores 455. Again, the incorporation of multiple ones of the interfaces 490 may be deemed appropriate in embodiments in which there are physically separate branches of the network to which the further processed packet could be directed, such as where the distribution device 400 is implemented in a physical form with a single "upstream" network interface port by which it receives encrypted packets and multiple "downstream" network interface ports to which it may transmit a further processed packet. By way of alternate example, there may be only a single one of the interfaces 490 through which encrypted packets are received and further processed packets are transmitted, or there may be one of the interfaces 490 largely dedicated to receiving the encrypted packets and one other of the interfaces 490 largely dedicated to transmitted the further processed packets. Again, still other quantities and/or configurations of one or more of the interfaces 490 may occur to those skilled in the art.

Figure 3A:
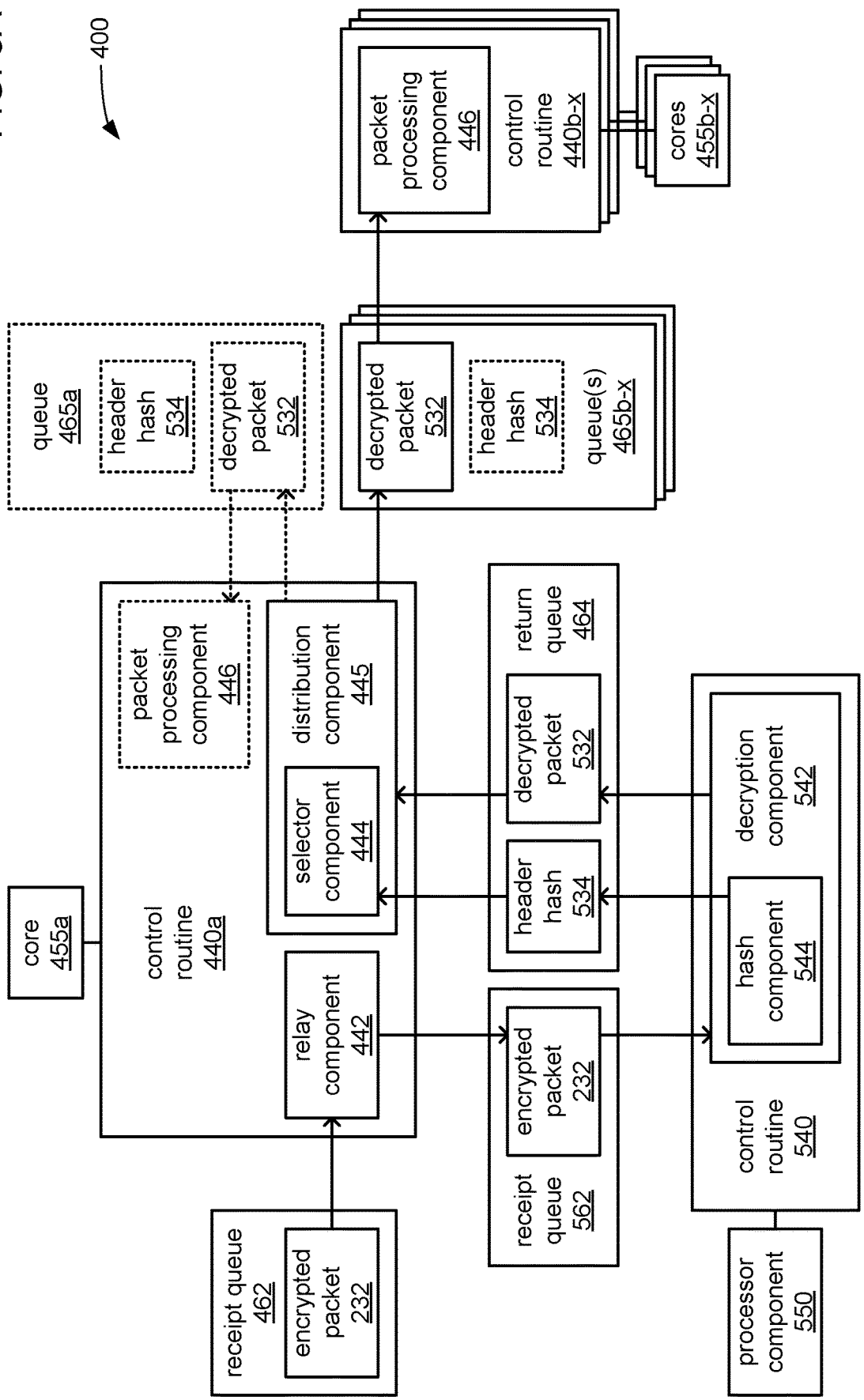
FIGS. 3A and 3B illustrates an example embodiment of a portion of a distribution device.

FIG. 3A depicts the exchanging of packets and of a header hash between the core 455a and the processor component 500 of the decryption controller 500 as discussed with reference to FIG. 2A in greater detail. As has been earlier discussed, each one of the multiple cores 455 may execute a separate instance of the control routine 440. In FIG. 3A, these separate instances are designated as 440a-x to correspond to the cores 455a-x, respectively, that may execute those instances.

As depicted, at least the instance of the control routine 440 designated as the control routine 440a may include one or more of a relay component 442, a distribution component 445 that in turn may include a selector component 444, and a packet processing component 446. These same components may also be included within the depicted instances of the control routine 440 designated as the control routines 440b-x. However, as will shortly be explained, the relay component 442 and the distribution component 445 (including the selector component 444) may not be executed in the instances of the control routine 440 designated as the control routine 440b-x such that they are not specifically depicted even though they may be present within those instances. Stated differently, in executing the control routine 440a, the core 455a may execute more than one of the components 442, 444, 445 and 446. In contrast, in executing the control routines 440b-x, the corresponding ones of the cores 455b-x may each execute the component 446, but not any of the components 442, 444 or 445.

As also depicted, the control routine 540 may include a decryption component 542 that in turn may include a hash component 544. In executing the control routine 540, the processor component 550 may execute one or both of the components 542 and 544.

As executed by the core 455a, the relay component 442 of the control routine 440a, may receive an encrypted packet 232, and at least a portion of that encrypted packet 232 may be at least temporarily stored within the receipt queue 462 during or subsequent to its reception. The relay component 442 may then relay the encrypted packet 232 to the decryption component 542 of the control routine 540, and the encrypted packet 232 may be temporarily stored in the receipt queue 562 amidst being so relayed.

As executed by the processor component 550, the decryption component 542 may decrypt the encrypted packet 232, thereby generating a corresponding decrypted packet 532 that the decryption component 542 may store within the return queue 464 as part of relaying the decrypted packet 532 to the distribution component 445 of the control routine 440a. As the processor component 550 is caused to access the header of the encrypted packet 232 as part of executing the decryption component 542 to decrypt the encrypted packet 232, the processor component 550 may also be caused by execution of the hash component 544 to use those accesses to the fields of the header during decryption to retrieve one or more pieces of information stored within one or more of those fields. The processor component 550 may then be caused by further execution of the hash component 544 to use those retrieved pieces of information from those fields of the header in a hash calculation to generate the header hash 534 and to store the header hash 534 in the return queue 464 as part of relaying the header hash 534 to the selection component 444.

Figure 4:
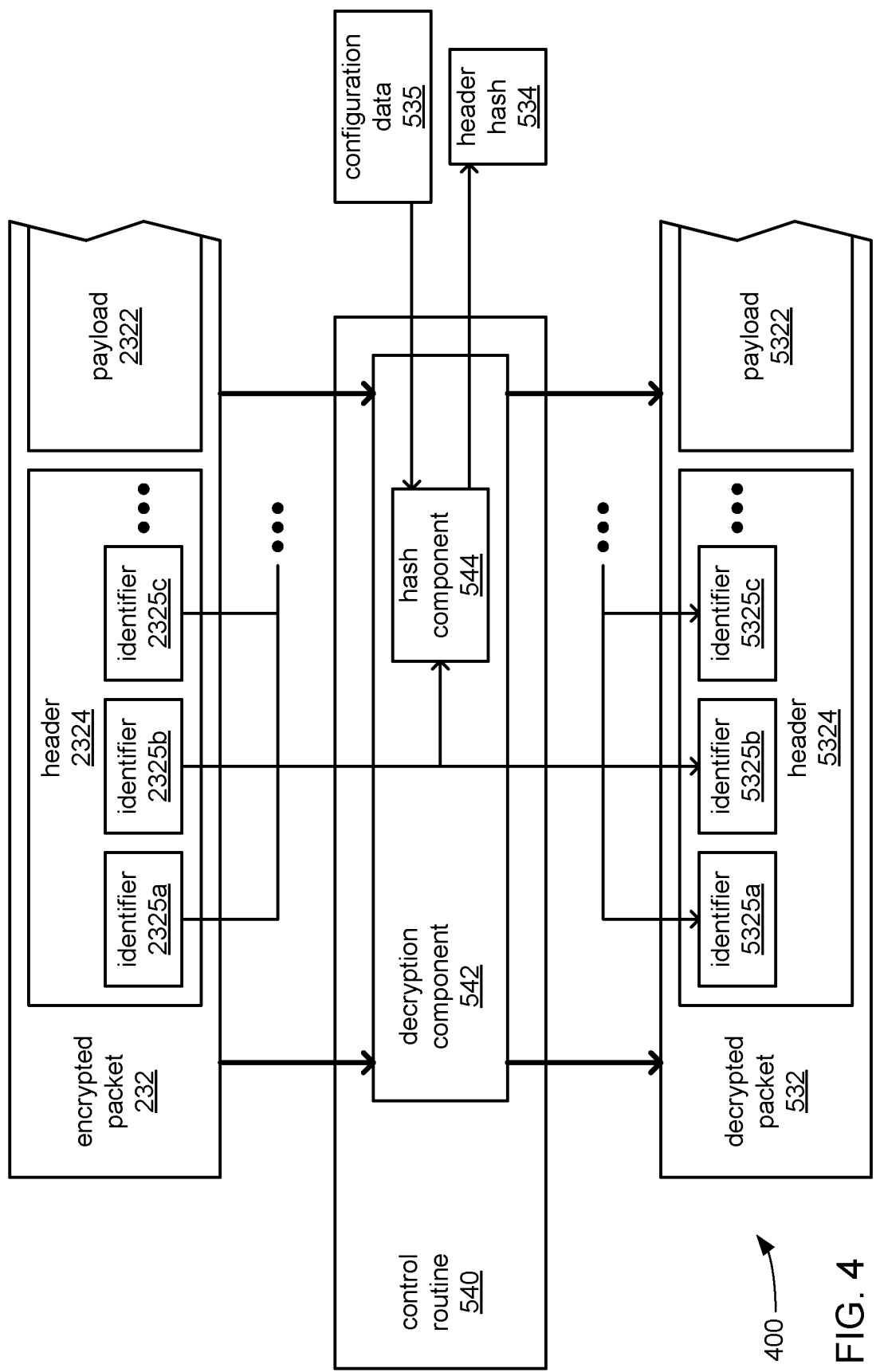
FIG. 4 illustrates an example embodiment of generating a header hash during decryption of an encrypted packet.

FIG. 4 illustrates a block diagram of an example embodiment of such generation of the header hash 534 amidst decryption of the encrypted packet 232 to generate the decrypted packet 532. As depicted, the encrypted packet 232 includes a payload 2322 made up of the data conveyed by the encrypted packet 232 and a header 2324 made up of various pieces of information concerning the encrypted packet 232 and/or its data. Correspondingly, the decrypted packet 532 includes a payload 5322 made up of the data conveyed by and copied from the payload 2322 of the encrypted packet 232, and a header 5324 made up of the pieces of information conveyed within and copied from the header 2324 of the encrypted packet 232. More simply, the decrypted packet 532 may essentially be re-creation of the encrypted packet 232, but in decrypted form.

As also depicted, as the various pieces of information in the header 2324 of the encrypted packet 232 are copied by the decryption component 542 to create the header 5324 of the decrypted packet 532, copies of one or more of those pieces of information may be used by the hash component 544 to generate the header hash 534. As also depicted, the particular pieces of information in the header 2324 that are copied and so used by the hash component 544 may be one or more identifiers 2325. As previously discussed, identifiers included within a header of a network packet may be identifiers of devices, transactions, processes, etc. that are associated with that packet. As also previously discussed, each of such identifiers may be multiple bytes in size, whereas the header hash generated by the hash component 544 from one or more of the identifiers 2325 may be considerably smaller. In some embodiments, the header hash 534 may be only a byte, word or doubleword in size.

As previously discussed, what pieces of information in the header 2324 of the encrypted packet 232 are used to generate the header hash may be configurable. As depicted, the hash component 544 may be provided with indications in the configuration data 535 of what are those pieces of information to so use. In still other embodiments, the hash component 544 may dynamically change what pieces of information are used to generate the header hash 534 per packet based on any of a variety of criterion concerning each packet, including and not limited to, which of the source devices 100 it originated at, what type of data is conveyed within each packet, etc. The hash component 544 may retrieve indications of what those criterion are from the configuration data 535.

Returning to FIG. 3A, as executed by the core 455a, the selector component 444 employs the header hash 534 to select one of the cores 455a-x or 455b-x (depending on whether the core 455a is to be included among those that may be selected) to perform further processing on the decrypted packet 532. With the selection made, then as executed by the core 455a, the distribution component 445 effects the selection made by the selector component 444 by relaying at least the decrypted packet 532 to a one of the queues 465a-x or 465b-x that corresponds to the selected one of the cores 455a-x or 455b-x, respectively. As executed by the selected one of the cores 455a-x or 455b-x, the packet processing component 446 of the corresponding one of the control routine 440a-x or 440b-x performs the further processing on the decrypted packet 532. As has been discussed, such further processing may entail any of a variety of actions, including and not limited to, re-encrypting the decrypted packet 532 and/or modifying the data making up the payload of the decrypted packet 532.

Turning more specifically to FIG. 2B, following decryption of the encrypted packet and generation of the header hash, the processor component 550 may then, itself, use the header hash to select one of the multiple cores 455 to perform further processing on the decrypted packet. Again, the core 455a may or may not be among those that may be so selected. The processor component 550 may then store the decrypted packet in one of the queues 456a-x or 465b-x that corresponds to the selected one of the cores 455a-x or 455b-x, respectively. Again, it should be noted that despite the depiction of a one-to-one correspondence of the queues 465a-x to the cores 455a-x, other embodiments are possible in which there may be a quantity of the queues 465 that differs from the quantity of the cores 455.

Following the further processing of the decrypted packet by the selected one of the cores 455a-x or 455b-x, that selected one of the cores may then operate a corresponding one of the interfaces 490a-x or 490b-x, respectively, to transmit the now further processed packet to one of the destination devices 800. Again, it should be noted that despite the depiction of a one-to-one correspondence of the cores 455a-x to the interfaces 490a-x, other embodiments are possible in which there may be a quantity of the interfaces 490 that differs from the quantity of the cores 455.

Figure 3B:
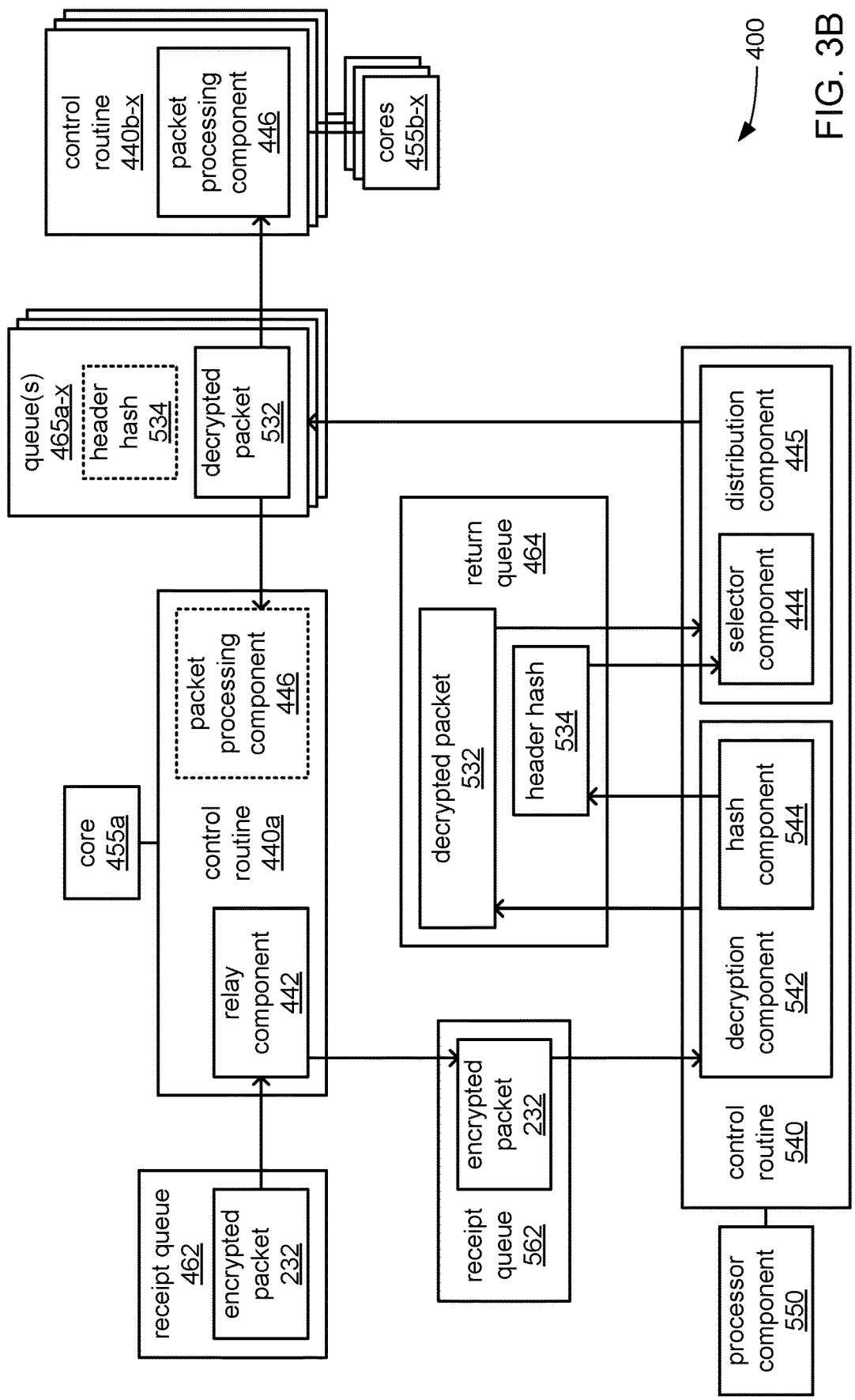

FIG. 3B depicts the exchanging of packets and of a header hash between one or more of the cores 455a-x and the processor component 500 of the decryption controller 500 as discussed with reference to FIG. 2B in greater detail. Again, each one of the multiple cores 455 may execute a separate instance of the control routine 440, and in FIG. 3B, these separate instances are designated as 440a-x to correspond to the cores 455a-x, respectively, that may execute those instances.

As depicted, unlike the instances of the control routine 440 of FIG. 3A, the instances of the control routine 440 of FIG. 3B may not include the distribution component 445 or its selector component 444. Instead, as depicted in FIG. 3B, the control routine 540 may include these components. Thus, it may be the processor component 550, and not the core 455a, that executes the selector component 444 to make a selection of one of the cores 455a-x or 455b-x to perform further processing on the decrypted packet 532. Further, it may be the processor component 550, and not the core 455a, that executes the distribution component 445 to effect the selection made by the selector component 444 by relaying the decrypted packet 532 to a queue that corresponds to the selected one of the cores 445a-x or 445b-x.

Figure 5:
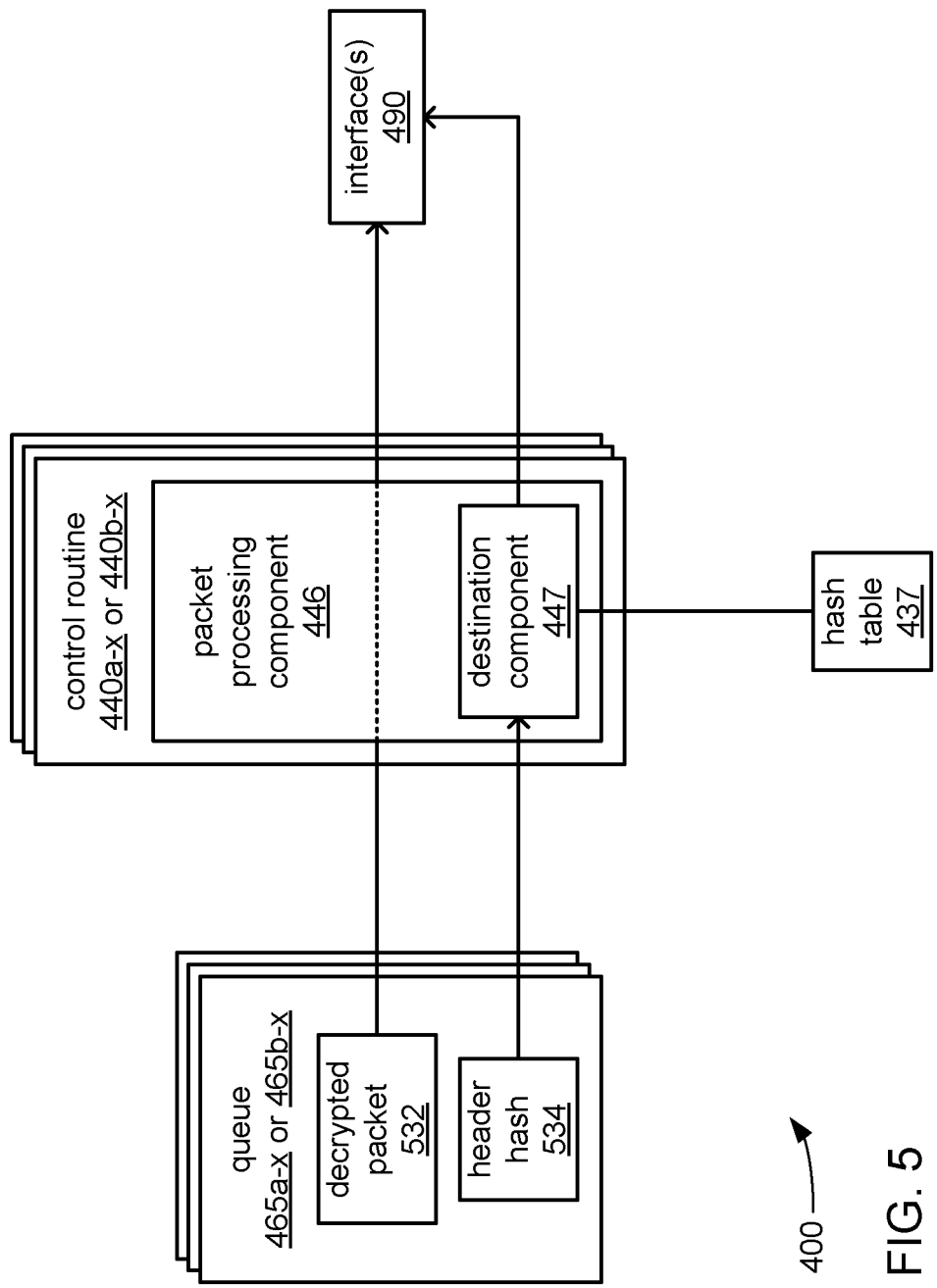
FIG. 5 illustrates an example embodiment of employing a header hash generated from a header of an encrypted packet to route a decrypted packet derived therefrom.

Returning to FIG. 1, as has been discussed, following the performance of any further processing by a selected one of the cores 455, that selected one of the cores may operate one of the one or more interfaces 490 to transmit the decrypted packet 532 onto the network 999 and toward its intended one of the destination devices 800. In so doing, that selected one of the cores 455 may employ the header hash 534 in identifying that one of the destination devices 800. FIG. 5 illustrates a block diagram of an embodiment of employing the header hash to identify one of the destination devices 800 towards which to transmit the decrypted packet 532.

As depicted, at least the packet processing component 446 executed by the one of the cores 455 selected to perform further processing on the decrypted packet 532 may include a destination component 447 for execution by the same one of the cores 455. As so executed, the destination component 447 may retrieve the header hash 534 from the one of the queues 465 into which it may have been stored, and may compare it to other header hashes stored in the hash table 437. The hash table 437 may be made up of indications of correlations between the values of various header hashes and identifiers of various ones of the destination devices 800. The hash table may be recurringly updated with indications of correlations derived from previous header hashes generated from previous packets.

In various embodiments, the storage 560 may be based on any of a wide variety of information storage technologies, possibly including volatile technologies requiring the uninterrupted provision of electric power, and possibly including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, the network interface controller 595 may implement an interface to the network 999 that may employ any of a wide variety of signaling technologies enabling these computing devices to be coupled to other devices as has been described. Each of these interfaces includes circuitry providing at least some of the requisite functionality to enable such coupling. However, each of these interfaces may also be at least partially implemented with sequences of instructions executed by corresponding ones of the processor components (e.g., to implement a protocol stack or other features). Where electrically and/or optically conductive cabling is employed, these interfaces may employ signaling and/or protocols conforming to any of a variety of industry standards, including without limitation, RS-232C, RS-422, USB, Ethernet (IEEE-802.3) or IEEE-1394. Where the use of wireless signal transmission is entailed, these interfaces may employ signaling and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1×RTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

Figure 6:
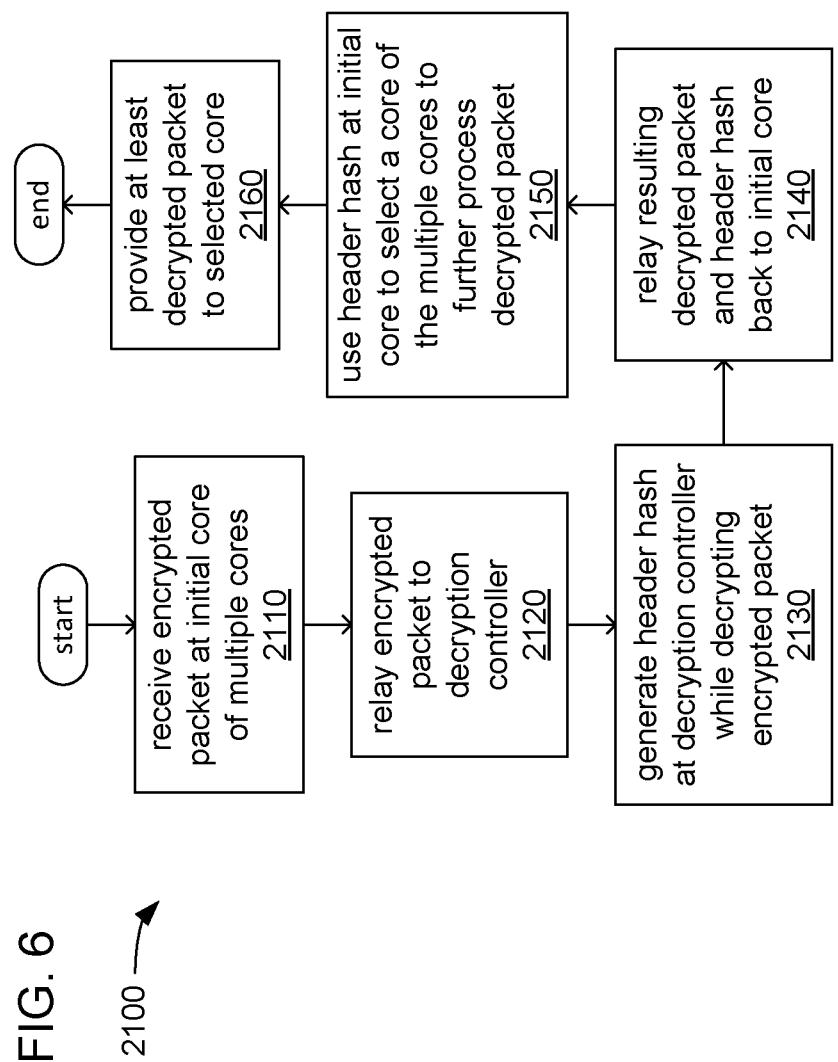
FIGS. 6 and 7 each illustrate a logic flow according to an embodiment.

FIG. 6 illustrates one embodiment of a logic flow 2100. The logic flow 2100 may be representative of some or all of the operations executed by one or more embodiments described herein. More specifically, the logic flow 2100 may illustrate operations performed by one or more of the cores 455 of one or more of the main processor components 450 and/or controller processor component 550 in executing one or both of the control routines 440 and 540, respectively, and/or performed by other component(s) of the distribution device 400.

At 2110, an initial core of a main processor component of a distribution device (e.g., one of the cores 455 of one of the processor components 450 of the distribution device 400) receives an encrypted packet. As has been discussed, such a packet may have been encrypted by the source device at which it originated or may by one of the intermediate devices along the path the packet took through a network (e.g., one of the intermediate devices 200 within the network 999).

At 2120, the initial core relays the encrypted packet to a decryption controller of the distribution device. As previously discussed, the distribution device may incorporate a processor component with an internal architecture that is well suited to performing decryption. By way of example, the processor component of the decryption controller may be configured to efficiently access at least large portions of a packet at a time, if not the entirety of a packet at a time.

At 2130, the processor component of the decryption controller (e.g., the processor component 550 of the decryption controller 500) generates a header hash from one or more pieces of information included within the header of the encrypted packet as the processor component of the decryption controller decrypts the encrypted packet to generate a decrypted packet. As previously discussed, how many and/or which pieces of information in the header of the encrypted packet are to be included in the header hash may be configurable. By way of example, in some embodiments, the selection of how many and/or which pieces of information in the header to include may be dynamically reconfigurable.

At 2140, the decryption controller relays the decrypted packet and the header hash back to the initial core.

At 2150, the initial core uses the header hash to select which core of multiple cores provided by one or more of the main processor components is to be the core to perform further processing on the decrypted packet. As previously discussed, such further processing may include re-encrypting the packet and/or scanning the data of the payload of the decrypted packet for malicious software.

At 2160, the initial core provides at least the decrypted packet to the selected one of the cores. As previously discussed, the selected core may make use of the header hash to determine what the intended destination device of the packet is.

Figure 7:
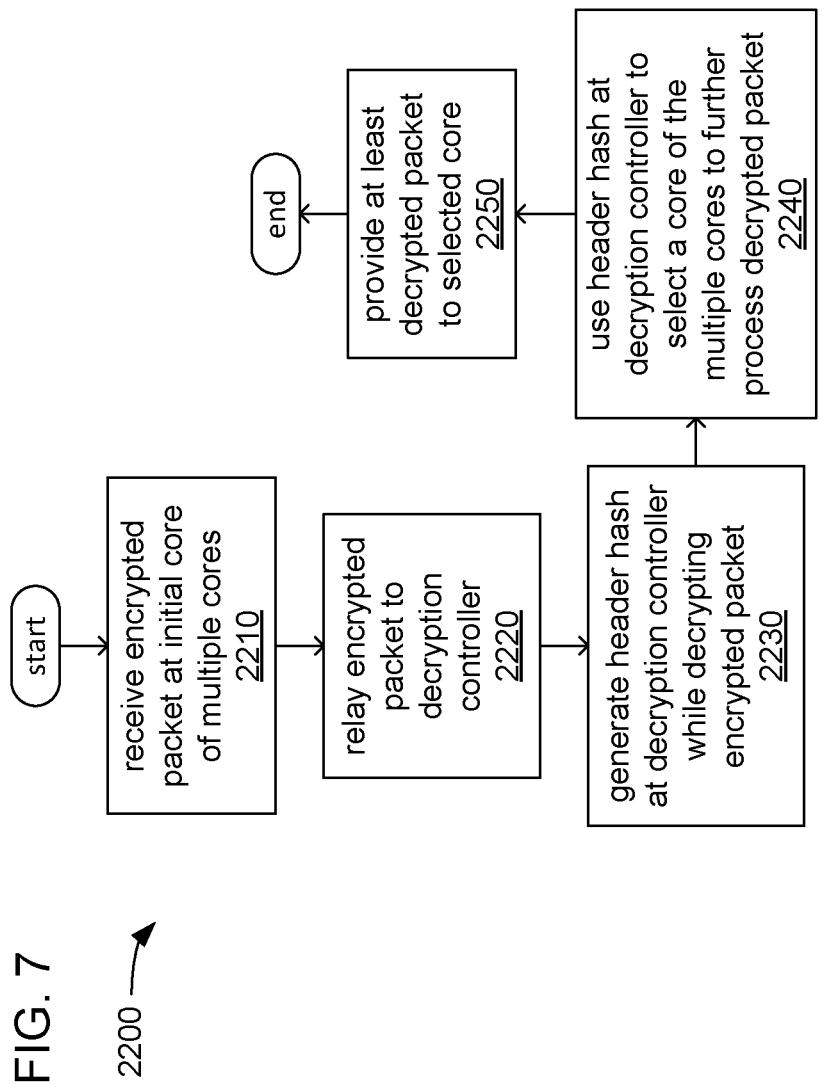

FIG. 7 illustrates one embodiment of a logic flow 2200. The logic flow 2200 may be representative of some or all of the operations executed by one or more embodiments described herein. More specifically, the logic flow 2200 may illustrate operations performed by one or more of the cores 455 of one or more of the main processor components 450 and/or controller processor component 550 in executing one or both of the control routines 440 and 540, respectively, and/or performed by other component(s) of the distribution device 400.

At 2210, an initial core of a main processor component of a distribution device (e.g., one of the cores 455 of one of the processor components 450 of the distribution device 400) receives an encrypted packet. Again, such a packet may have been encrypted by the source device at which it originated or may by one of the intermediate devices along its path to the distribution device.

At 2220, the initial core relays the encrypted packet to a decryption controller of the distribution device. Again, the distribution device may incorporate a processor component with an internal architecture that is well suited to performing decryption.

At 2230, the processor component of the decryption controller (e.g., the processor component 550 of the decryption controller 500) generates a header hash from one or more pieces of information included within the header of the encrypted packet as the processor component of the decryption controller decrypts the encrypted packet to generate a decrypted packet. Again, how many and/or which pieces of information in the header of the encrypted packet are to be included in the header hash may be configurable.

At 2240, the processor component of the decryption controller uses the header hash to select which core of multiple cores provided by one or more of the main processor components is to be the core to perform further processing on the decrypted packet. At 2250, the processor component of the decryption controller provides at least the decrypted packet to the selected one of the cores. Again, the selected core may make use of the header hash to determine what the intended destination device of the packet is.

Figure 8:
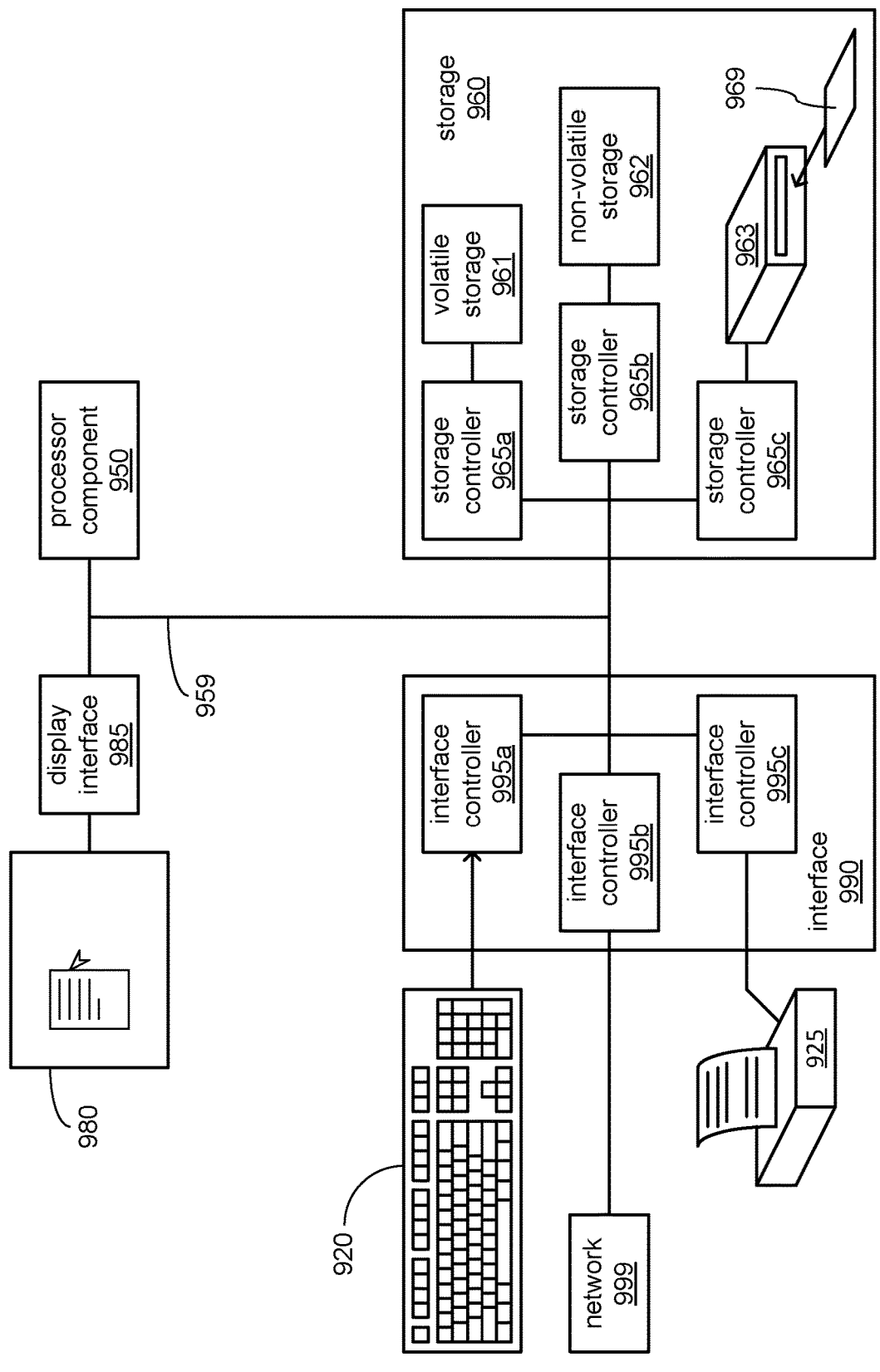
FIG. 8 illustrates a processing architecture according to an embodiment.

FIG. 8 illustrates an embodiment of an exemplary processing architecture 3000 suitable for implementing various embodiments as previously described. More specifically, the processing architecture 3000 (or variants thereof) may be implemented as part of one or more of the computing devices 100, 300, 500 or 700, and/or as part of the controller 600. It should be noted that components of the processing architecture 3000 are given reference numbers in which the last two digits correspond to the last two digits of reference numbers of at least some of the components earlier depicted and described as part of the computing devices 100, 300, 500 and 700, as well as the controller 600. This is done as an aid to correlating components of each.

The processing architecture 3000 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor component, the processor component itself, a storage device (e.g., a hard disk drive, multiple storage drives in an array, etc.) that may employ an optical and/or magnetic storage medium, a software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to one or more signal lines. A message (including a command, status, address or data message) may be one of such signals or may be a plurality of such signals, and may be transmitted either serially or substantially in parallel through any of a variety of connections and/or interfaces.

As depicted, in implementing the processing architecture 3000, a computing device includes at least a processor component 950, a storage 960, an interface 990 to other devices, and a coupling 959. As will be explained, depending on various aspects of a computing device implementing the processing architecture 3000, including its intended use and/or conditions of use, such a computing device may further include additional components, such as without limitation, a display interface 985.

The coupling 959 includes one or more buses, point-to-point interconnects, transceivers, buffers, crosspoint switches, and/or other conductors and/or logic that communicatively couples at least the processor component 950 to the storage 960. Coupling 959 may further couple the processor component 950 to one or more of the interface 990, the audio subsystem 970 and the display interface 985 (depending on which of these and/or other components are also present). With the processor component 950 being so coupled by couplings 959, the processor component 950 is able to perform the various ones of the tasks described at length, above, for whichever one(s) of the aforedescribed computing devices implement the processing architecture 3000. Coupling 959 may be implemented with any of a variety of technologies or combinations of technologies by which signals are optically and/or electrically conveyed. Further, at least portions of couplings 959 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor component 950 (corresponding to the processor components 550 and 650) may include any of a wide variety of commercially available processors, employing any of a wide variety of technologies and implemented with one or more cores physically combined in any of a number of ways.

As previously discussed, the storage 960 (corresponding to the storages 560 and 660) may be made up of one or more distinct storage devices based on any of a wide variety of technologies or combinations of technologies. More specifically, as depicted, the storage 960 may include one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between computing devices). This depiction of the storage 960 as possibly including multiple distinct types of storage is in recognition of the commonplace use of more than one type of storage device in computing devices in which one type provides relatively rapid reading and writing capabilities enabling more rapid manipulation of data by the processor component 950 (but possibly using a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 961 is present and is based on RAM technology, the volatile storage 961 may be communicatively coupled to coupling 959 through a storage controller 965a providing an appropriate interface to the volatile storage 961 that perhaps employs row and column addressing, and where the storage controller 965a may perform row refreshing and/or other maintenance tasks to aid in preserving information stored within the volatile storage 961. By way of another example, where the non-volatile storage 962 is present and includes one or more ferromagnetic and/or solid-state disk drives, the non-volatile storage 962 may be communicatively coupled to coupling 959 through a storage controller 965b providing an appropriate interface to the non-volatile storage 962 that perhaps employs addressing of blocks of information and/or of cylinders and sectors. By way of still another example, where the removable media storage 963 is present and includes one or more optical and/or solid-state disk drives employing one or more pieces of tangible machine-readable storage medium 969, the removable media storage 963 may be communicatively coupled to coupling 959 through a storage controller 965c providing an appropriate interface to the removable media storage 963 that perhaps employs addressing of blocks of information, and where the storage controller 965c may coordinate read, erase and write operations in a manner specific to extending the lifespan of the tangible machine-readable storage medium 969.

One or the other of the volatile storage 961 or the non-volatile storage 962 may include an article of manufacture in the form of a machine-readable storage media on which a routine including a sequence of instructions executable by the processor component 950 may be stored, depending on the technologies on which each is based. By way of example, where the non-volatile storage 962 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to a tangible machine-readable storage medium such as a floppy diskette. By way of another example, the non-volatile storage 962 may be made up of banks of solid-state storage devices to store information, such as sequences of instructions, in a manner akin to a compact flash card. Again, it is commonplace to employ differing types of storage devices in a computing device at different times to store executable routines and/or data. Thus, a routine including a sequence of instructions to be executed by the processor component 950 may initially be stored on the tangible machine-readable storage medium 969, and the removable media storage 963 may be subsequently employed in copying that routine to the non-volatile storage 962 for longer term storage not requiring the continuing presence of the tangible machine-readable storage medium 969 and/or the volatile storage 961 to enable more rapid access by the processor component 950 as that routine is executed.

As previously discussed, the interface 990 (possibly corresponding to the interface 590) may employ any of a variety of signaling technologies corresponding to any of a variety of communications technologies that may be employed to communicatively couple a computing device to one or more other devices. Again, one or both of various forms of wired or wireless signaling may be employed to enable the processor component 950 to interact with input/output devices (e.g., the depicted example keyboard 920 or printer 925) and/or other computing devices, possibly through a network (e.g., the network 999) or an interconnected set of networks. In recognition of the often greatly different character of multiple types of signaling and/or protocols that must often be supported by any one computing device, the interface 990 is depicted as including multiple different interface controllers 995a, 995b and 995c. The interface controller 995a may employ any of a variety of types of wired digital serial interface or radio frequency wireless interface to receive serially transmitted messages from user input devices, such as the depicted keyboard 920. The interface controller 995b may employ any of a variety of cabling-based or wireless signaling, timings and/or protocols to access other computing devices through the depicted network 999 (perhaps a network made up of one or more links, smaller networks, or perhaps the Internet). The interface 995c may employ any of a variety of electrically conductive cabling enabling the use of either serial or parallel signal transmission to convey data to the depicted printer 925. Other examples of devices that may be communicatively coupled through one or more interface controllers of the interface 990 include, without limitation, a microphone to monitor sounds of persons to accept commands and/or data signaled by those persons via voice or other sounds they may make, remote controls, stylus pens, card readers, finger print readers, virtual reality interaction gloves, graphical input tablets, joysticks, other keyboards, retina scanners, the touch input component of touch screens, trackballs, various sensors, a camera or camera array to monitor movement of persons to accept commands and/or data signaled by those persons via gestures and/or facial expressions, laser printers, inkjet printers, mechanical robots, milling machines, etc.

Where a computing device is communicatively coupled to (or perhaps, actually incorporates) a display (e.g., the depicted example display 980), such a computing device implementing the processing architecture 3000 may also include the display interface 985. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 985 in a communicative coupling of the display 980 may make use of signaling and/or protocols that conform to any of a variety of industry standards, including without limitation, any of a variety of analog video interfaces, Digital Video Interface (DVI), DisplayPort, etc.

More generally, the various elements of the computing devices described and depicted herein may include various hardware elements, software elements, or a combination of both. Examples of hardware elements may include devices, logic devices, components, processors, microprocessors, circuits, processor components, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. Furthermore, aspects or elements from different embodiments may be combined.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

In Example 1, an apparatus includes a processor component; a decryption component to decrypt an encrypted packet to generate a decrypted packet from the encrypted packet, the encrypted packet including a header that includes at least one field of information concerning the encrypted packet; a hash component to generate a header hash from the at least one field of information during decryption of at least a portion of the encrypted packet by the decryption component, the header hash including a smaller quantity of bits than the at least one field of information; and a distribution component to select a first core of multiple cores coupled to the processor component based on the header hash and to transmit the decrypted packet to the first core from the processor component.

In Example 2, which includes the subject matter of Example 1, the apparatus may include the multiple cores and an interface to couple one of the first core and a second core of the multiple cores to a network, and the one of the first core and the second core may relay the encrypted packet to the processor component from the network.

In Example 3, which includes the subject matter of any of Examples 1-2, the hash component may perform a checksum calculation on the at least one field of information to generate the header hash.

In Example 4, which includes the subject matter of any of Examples 1-3, the at least one field of information may include an identifier of at least one of a source device of the encrypted packet, a destination device of the encrypted packet, an online transaction associated with the encrypted packet, an executable process associated with the encrypted packet or a type of data within a payload of the encrypted packet.

In Example 5, which includes the subject matter of any of Examples 1-4, the header of each of multiple encrypted packets may include multiple fields of information that may include the at least one field of information, the multiple encrypted packets may include the encrypted packet, and the hash component may dynamically select the at least one field of information from the multiple fields of information from which to generate the header hash for each encrypted packet of the multiple encrypted packets based on at least one of a source device of each encrypted packet, a destination device of each encrypted packet, an online transaction associated with each encrypted packet, an executable process associated with each encrypted packet or a type of data within a payload of each encrypted packet.

In Example 6, which includes the subject matter of any of Examples 1-5, the apparatus may include the multiple cores, each core of the multiple cores may perform further processing on multiple decrypted packets that include the decrypted packet, and the further processing may include at least one of re-encryption, a scan of data within a payload of each of the multiple decrypted packets, digital signal processing to alter a characteristic of speech represented by the data within the payload of each of the multiple decrypted packets, or determining a destination of each of the multiple decrypted packets based on a header hash generated by the hash component during decryption to generate each of the multiple decrypted packets.

In Example 7, which includes the subject matter of any of Examples 1-6, the apparatus may include the multiple cores and a destination component for execution by the first core to determine a destination of the decrypted packet based on the header hash, and the header hash may be transmitted to the first core by the distribution component along with the decrypted packet.

In Example 8, which includes the subject matter of any of Examples 1-7, the apparatus may include multiple interfaces, each interface may couple at least the first core of the multiple cores to a different branch of multiple branches of a network, and the destination component may select one of the interfaces based on the header hash and to route the decrypted packet to the selected one of the multiple interfaces.

In Example 9, which includes the subject matter of any of Examples 1-8, the apparatus may include an interface to couple the first core to a network, and the destination component may select one of multiple virtual private networks (VPNs) formed through the network based on the header hash and to route the decrypted packet to the selected one of the multiple VPNs.

In Example 10, an apparatus includes a processor component; a decryption component for execution by the processor component to decrypt an encrypted packet to generate a decrypted packet from the encrypted packet, the encrypted packet including a header that includes at least one field of information concerning the encrypted packet; a hash component for execution by the processor component to generate a header hash from the at least one field of information during decryption of at least a portion of the encrypted packet by the decryption component, the header hash including a smaller quantity of bits than the at least one field of information; multiple cores coupled to the processor component, the multiple cores including a first core; and a distribution component for execution by the first core to select a second core of the multiple cores based on the header hash and to transmit the decrypted packet to the second core.

In Example 11, which includes the subject matter of Example 10, the apparatus may include an interface to couple the first core to a network, and the first core may relay the encrypted packet to the processor component from the network.

In Example 12, which includes the subject matter of any of Examples 10-11, the hash component may perform a checksum calculation on the at least one field of information to generate the header hash.

In Example 13, which includes the subject matter of any of Examples 10-12, the at least one field of information may include an identifier of at least one of a source device of the encrypted packet, a destination device of the encrypted packet, an online transaction associated with the encrypted packet, an executable process associated with the encrypted packet or a type of data within a payload of the encrypted packet.

In Example 14, which includes the subject matter of any of Examples 10-13, the header of each of multiple encrypted packets may include multiple fields of information that may include the at least one field of information, the multiple encrypted packets may include the encrypted packet, and the hash component may dynamically select the at least one field of information from the multiple fields of information from which to generate the header hash for each encrypted packet of the multiple encrypted packets based on at least one of a source device of each encrypted packet, a destination device of each encrypted packet, an online transaction associated with each encrypted packet, an executable process associated with each encrypted packet or a type of data within a payload of each encrypted packet.

In Example 15, which includes the subject matter of any of Examples 10-14, each core of the multiple cores may perform further processing on multiple decrypted packets that may include the decrypted packet, and the further processing may include at least one of re-encryption, a scan of data within a payload of each of the multiple decrypted packets, digital signal processing to alter a characteristic of speech represented by the data within the payload of each of the multiple decrypted packets, or determining a destination of each of the multiple decrypted packets based on a header hash generated by the hash component during decryption to generate each of the multiple decrypted packets.

In Example 16, which includes the subject matter of any of Examples 10-15, the apparatus may include a destination component for execution by the second core to determine a destination of the decrypted packet based on the header hash, and the header hash may be transmitted to the second core from the first core by the distribution component along with the decrypted packet.

In Example 17, which includes the subject matter of any of Examples 10-16, the apparatus may include multiple interfaces, each interface may couple at least the second core of the multiple cores to a different branch of multiple branches of a network, and the destination component may select one of the interfaces based on the header hash and to route the decrypted packet to the selected one of the multiple interfaces.

In Example 18, which includes the subject matter of any of Examples 10-17, the apparatus may include an interface to couple the second core to a network, and the destination component may select one of multiple virtual private networks (VPNs) formed through the network based on the header hash and to route the decrypted packet to the selected one of the multiple VPNs.

In Example 19, a computing-implemented method includes decrypting, at a processor component, an encrypted packet to generate a decrypted packet from the encrypted packet, the encrypted packet including a header that includes at least one field of information concerning the encrypted packet; generating, at the processor component, a header hash from the at least one field of information during decryption of at least a portion of the encrypted packet, the header hash including a smaller quantity of bits than the at least one field of information; selecting a first core of multiple cores coupled to the processor component based on the header hash; and transmitting the decrypted packet to the first core from the processor component.

In Example 20, which includes the subject matter of Example 19, the method may include performing a checksum calculation on the at least one field of information to generate the header hash.

In Example 21, which includes the subject matter of any of Examples 19-20, the method may include storing the encrypted packet in a receipt queue; and retrieving the header from the receipt queue one time to decrypt the header and to generate the header hash from the at least one field of information.

In Example 22, which includes the subject matter of any of Examples 19-21, the at least one field of information may include an identifier of at least one of a source device of the encrypted packet, a destination device of the encrypted packet, an online transaction associated with the encrypted packet, an executable process associated with the encrypted packet or a type of data within a payload of the encrypted packet.

In Example 23, which includes the subject matter of any of Examples 19-22, the header of each of multiple encrypted packets may include multiple fields of information that may include the at least one field of information, the multiple encrypted packets may include the encrypted packet, and the method may include dynamically selecting the at least one field of information from the multiple fields of information from which to generate the header hash for each encrypted packet of the multiple encrypted packets based on at least one of a source device of each encrypted packet, a destination device of each encrypted packet, an online transaction associated with each encrypted packet, an executable process associated with each encrypted packet or a type of data within a payload of each encrypted packet.

In Example 24, which includes the subject matter of any of Examples 19-23, each core of the multiple cores may perform further processing on multiple decrypted packets that may include the decrypted packet, and the further processing may include at least one of re-encryption, a scan of data within a payload of each of the multiple decrypted packets, digital signal processing to alter a characteristic of speech represented by the data within the payload of each of the multiple decrypted packets, or determining a destination of each of the multiple decrypted packets based on a header hash generated during decryption to generate each of the multiple decrypted packets.

In Example 25, which includes the subject matter of any of Examples 19-24, the method may include transmitting the header hash to the first core from the processor component; and determining, at the first core, a destination of the decrypted packet based on the header hash.

In Example 26, which includes the subject matter of any of Examples 19-25, at least the first core of the multiple cores may be coupled to different branches of multiple branches of a network by each interface of multiple interfaces, and the method may include selecting one of the interfaces based on the header hash and routing the decrypted packet to the selected one of the multiple interfaces.

In Example 27, which includes the subject matter of any of Examples 19-26, at least the first core of the multiple cores may be coupled to a network, and the method may include selecting one of multiple virtual private networks (VPNs) formed through the network based on the header hash and routing the decrypted packet to the selected one of the multiple VPNs In Example 28, at least one tangible machine-readable storage medium includes instructions that when executed by a processor component, may cause the processor component to decrypt an encrypted packet to generate a decrypted packet from the encrypted packet, the encrypted packet including a header that includes at least one field of information concerning the encrypted packet; generate a header hash from the at least one field of information during decryption of at least a portion of the encrypted packet, the header hash including a smaller quantity of bits than the at least one field of information; select a first core of multiple cores coupled to the processor component based on the header hash; and transmit the decrypted packet to the first core from the processor component.

In Example 29, which includes the subject matter of Example 28, the processor component may be caused to perform a checksum calculation on the at least one field of information to generate the header hash.

In Example 30, which includes the subject matter of any of Examples 28-29, the processor component may be caused to store the encrypted packet in a receipt queue and retrieve the header from the receipt queue one time to decrypt the header and to generate the header hash from the at least one field of information.

In Example 31, which includes the subject matter of any of Examples 28-30, the at least one field of information may include an identifier of at least one of a source device of the encrypted packet, a destination device of the encrypted packet, an online transaction associated with the encrypted packet, an executable process associated with the encrypted packet or a type of data within a payload of the encrypted packet.

In Example 32, which includes the subject matter of any of Examples 28-31, the header of each of multiple encrypted packets may include multiple fields of information that may include the at least one field of information, the multiple encrypted packets may include the encrypted packet, and the processor component may be caused to dynamically select the at least one field of information from the multiple fields of information from which to generate the header hash for each encrypted packet of the multiple encrypted packets based on at least one of a source device of each encrypted packet, a destination device of each encrypted packet, an online transaction associated with each encrypted packet, an executable process associated with each encrypted packet or a type of data within a payload of each encrypted packet.

In Example 33, which includes the subject matter of any of Examples 28-32, each core of the multiple cores may perform further processing on multiple decrypted packets that may include the decrypted packet, and the further processing may include at least one of re-encryption, a scan of data within a payload of each of the multiple decrypted packets, digital signal processing to alter a characteristic of speech represented by the data within the payload of each of the multiple decrypted packets, or determining a destination of each of the multiple decrypted packets based on a header hash generated during decryption to generate each of the multiple decrypted packets.

In Example 34, which includes the subject matter of any of Examples 28-33, the processor component may be caused to transmit the header hash to the first core from the processor component and determine, at the first core, a destination of the decrypted packet based on the header hash.

In Example 35, which includes the subject matter of any of Examples 28-34, at least the first core of the multiple cores may be coupled to different branches of multiple branches of a network by each interface of multiple interfaces, and the processor component may be caused to select one of the interfaces based on the header hash and route the decrypted packet to the selected one of the multiple interfaces.

In Example 36, which includes the subject matter of any of Examples 28-35, at least the first core of the multiple cores may be coupled to a network, and the processor component may be caused to select one of multiple virtual private networks (VPNs) formed through the network based on the header hash and route the decrypted packet to the selected one of the multiple VPNs.

In Example 37, at least one tangible machine-readable storage medium may include instructions that when executed by a controller processor component, cause the computing device to perform any of the above.

In Example 38, an apparatus may include means for performing any of the above.

The invention claimed is:

1. An apparatus to distribute packets comprising:
a decryption controller;
a processor component coupled to the decryption controller, the processor component comprising multiple cores and at least one first logic, the at least one first logic to:
receive an encrypted packet at a first core of the multiple cores, each of the multiple cores associated with a core value within a range of core values, and
provide, via the first one of the multiple cores, the encrypted packet to the decryption controller; and
a second logic arranged in the decryption controller, the second logic to:
decrypt the encrypted packet to generate a decrypted packet, the encrypted packet comprising a header and a payload, the header to comprise multiple fields of information concerning the encrypted packet, the payload to comprise data representing speech,
select at least one field of information from the multiple fields of information from which to generate a header hash, and
generate the header hash from the selected at least one field of information, the header hash comprising a smaller quantity of bits than the at least one field of information; and
a destination component for execution by the first core to:
determine a core of the multiple cores to receive the decrypted packet based on the header hash by determining which of the multiple cores is associated with the core value corresponding to a header value generated based on a subset of bits of the header, the header hash transmitted to the first core by the destination component along with the decrypted packet.

2. The apparatus of claim 1, comprising:
the multiple cores comprising a first core; and
an interface to couple one of the first core or a second core of the multiple cores to a network, the one of the first core or the second core to relay the encrypted packet to the processor component from the network.

3. The apparatus of claim 1, the multiple fields of information comprising an identifier of at least one of a source device of the encrypted packet, a destination device of the encrypted packet, an online transaction associated with the encrypted packet, an executable process associated with the encrypted packet, or a type of data within the payload of the encrypted packet.

4. The apparatus of claim 3, the header of each of multiple encrypted packets comprising multiple fields of information that comprise the at least one field of information, the multiple encrypted packets comprising the encrypted packet, and a hash component to dynamically select the at least one field of information from the multiple fields of information from which to generate the header hash for each encrypted packet of the multiple encrypted packets based on at least one of a source device of each encrypted packet, a destination device of each encrypted packet, an online transaction associated with each encrypted packet, an executable process associated with each encrypted packet or a type of data within the payload of each encrypted packet.

5. The apparatus of claim 1, comprising the multiple cores, each core of the multiple cores to perform further processing on multiple decrypted packets that comprise the decrypted packet, the further processing comprising at least one of re-encryption, a scan of data within the payload of each of the multiple decrypted packets, digital signal processing to alter a characteristic of the speech represented by the data within the payload of each of the multiple decrypted packets, or determining a destination of each of the multiple decrypted packets based on a header hash generated by a hash component during decryption to generate each of the multiple decrypted packets.

6. The apparatus of claim 1, comprising multiple interfaces, each interface to couple at least the first core of the multiple cores to a different branch of multiple branches of a network, and the destination component to select one of the interfaces based on the header hash and to route the decrypted packet to the selected one of the multiple interfaces.

7. An apparatus to distribute packets comprising:
a decryption controller;
a processor component;
multiple cores coupled to the processor component, each of the multiple cores associated with a core value within a range of core values;
a memory storing first instructions to be executed by the decryption controller to:
decrypt an encrypted packet, provided by a first core of the multiple cores, to generate a decrypted packet from the encrypted packet, the encrypted packet comprising a header and a payload, the header to comprise multiple fields of information concerning the encrypted packet, the payload to comprise data representing speech,
select at least one field of information from the multiple fields of information from which to generate a header hash,
generate the header hash from the selected at least one field of information, the header hash comprising a smaller quantity of bits than the at least one field of information; and
a destination component for execution by the first core to:
determine a core of the multiple cores to receive the decrypted packet based on the header hash by determining which of the multiple cores is associated with the core value corresponding to a header value generated based on a subset of bits of the header, the header hash transmitted to the first core by the destination component along with the decrypted packet.

8. The apparatus of claim 7, the multiple cores comprising a first core, comprising an interface to couple the first core to a network, the first core to relay the encrypted packet to the processor component from the network.

9. The apparatus of claim 7, further comprising a hash component to perform a checksum calculation on the at least one field of information to generate the header hash.

10. The apparatus of claim 7, each core of the multiple cores to perform further processing on multiple decrypted packets that comprise the decrypted packet, the further processing comprising at least one of re-encryption, a scan of data within the payload of each of the multiple decrypted packets, digital signal processing to alter a characteristic of the speech represented by the data within the payload of each of the multiple decrypted packets, or determining a destination of each of the multiple decrypted packets based on a header hash generated by a hash component during decryption to generate each of the multiple decrypted packets.

11. A computer-implemented method for distributing packets, comprising:
   decrypting, at a decryption controller, an encrypted packet to generate a decrypted packet from the encrypted packet, the encrypted packet comprising a header and a payload, the header to comprise multiple fields of information concerning the encrypted packet, the payload to comprise data representing speech;
   selecting, at the encryption controller, at least one field of information from the multiple fields of information from which to generate a header hash;
   generating, at the decryption controller, the header hash from the selected at least one field of information, the header hash comprising a smaller quantity of bits than the at least one field of information;
   transmitting the header hash to a first core of multiple cores from the decryption controller; and
   determining, at the first core, a destination of the decrypted packet based on a core value within a range of core values associated with the multiple cores coupled to a processor component based on the header hash by determining which of the multiple cores is associated with the core value corresponding to a header value generated based on a subset of bits of the header.

12. The computer-implemented method of claim 11, the method comprising:
   storing the encrypted packet in a receipt queue; and
   retrieving the header from the receipt queue one time to decrypt the header and to generate the header hash from the at least one field of information.

13. The computer-implemented method of claim 11, the multiple fields of information comprising an identifier of at least one of a source device of the encrypted packet, a destination device of the encrypted packet, an online transaction associated with the encrypted packet, an executable process associated with the encrypted packet or a type of data within the payload of the encrypted packet.

14. The computer-implemented method of claim 13, the header of each of multiple encrypted packets comprising multiple fields of information that comprise the at least one field of information, the multiple encrypted packets comprising the encrypted packet, and the method comprising dynamically selecting the at least one field of information from the multiple fields of information from which to generate the header hash for each encrypted packet of the multiple encrypted packets based on at least one of a source device of each encrypted packet, a destination device of each encrypted packet, an online transaction associated with each encrypted packet, an executable process associated with each encrypted packet or a type of data within the payload of each encrypted packet.

15. At least one non-transitory tangible machine-readable storage medium comprising instructions that when executed by a decryption controller, cause the decryption controller to:
   decrypt an encrypted packet, provided by a first core of multiple cores, to generate a decrypted packet from the encrypted packet, the encrypted packet comprising a header and a payload, the header to comprise multiple fields of information concerning the encrypted packet, the payload to comprise data representing speech;
   select at least one field of information from the multiple fields of information from which to generate a header hash;
   generate the header hash from the selected at least one field of information, the header hash comprising a smaller quantity of bits than the at least one field of information;
   provide the header hash to the first core; and
   select, via the first core, a core of multiple cores associated with a core value within a range of core values coupled to a processor component based on the header hash by determining which of the multiple cores is associated with the core value corresponding to a header value generated based on a subset of bits of the header.

16. The at least one non-transitory tangible machine-readable storage medium of claim 15, the decryption controller caused to perform a checksum calculation on the at least one field of information to generate the header hash.

17. The at least one non-transitory tangible machine-readable storage medium of claim 15, the multiple fields of information comprising an identifier of at least one of a source device of the encrypted packet, a destination device of the encrypted packet, an online transaction associated with the encrypted packet, an executable process associated with the encrypted packet or a type of data within the payload of the encrypted packet.

18. The at least one non-transitory tangible machine-readable storage medium of claim 17, the header of each of multiple encrypted packets comprising multiple fields of information that comprise the at least one field of information, the multiple encrypted packets comprising the encrypted packet, and the processor component caused to dynamically select the at least one field of information from the multiple fields of information from which to generate the header hash for each encrypted packet of the multiple encrypted packets based on at least one of a source device of each encrypted packet, a destination device of each encrypted packet, an online transaction associated with each encrypted packet, an executable process associated with each encrypted packet or a type of data within the payload of each encrypted packet.

19. The at least one non-transitory tangible machine-readable storage medium of claim 17, each core of the multiple cores to perform further processing on multiple decrypted packets that comprise the decrypted packet, the further processing comprising at least one of re-encryption, a scan of data within the payload of each of the multiple decrypted packets, digital signal processing to alter a characteristic of the speech represented by the data within the payload of each of the multiple decrypted packets, or determining a destination of each of the multiple decrypted packets based on a header hash generated during decryption to generate each of the multiple decrypted packets.

20. The at least one non-transitory tangible machine-readable storage medium of claim 15, at least the first core of the multiple cores coupled to different branches of multiple branches of a network by each interface of multiple interfaces, the processor component caused to:
   select one of the interfaces based on the header hash; and
   route the decrypted packet to the selected one of the multiple interfaces.

21. The at least one non-transitory tangible machine-readable storage medium of claim 20, at least the first core of the multiple cores coupled to a network, the processor component caused to:

select one of multiple virtual private networks (VPNs) formed through the network based on the header hash; and route the decrypted packet to the selected one of the multiple VPNs.

* * * * *